(12) United States Patent
Unagami et al.

(10) Patent No.: US 11,915,527 B2
(45) Date of Patent: Feb. 27, 2024

(54) ELECTRONIC VOTING SYSTEM AND CONTROL METHOD

(71) Applicant: PANASONIC INTELLECTUAL PROPERTY CORPORATION OF AMERICA, Torrance, CA (US)

(72) Inventors: Yuji Unagami, Osaka (JP); Junichiro Soeda, Nara (JP); Akira Tanaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 299 days.

(21) Appl. No.: 17/025,089

(22) Filed: Sep. 18, 2020

(65) Prior Publication Data

US 2021/0005040 A1 Jan. 7, 2021

Related U.S. Application Data

(63) Continuation of application No. 16/108,134, filed on Aug. 22, 2018, now Pat. No. 10,818,121.

(Continued)

(30) Foreign Application Priority Data

May 15, 2018 (JP) ................. 2018-093921

(51) Int. Cl.
*G07C 13/00* (2006.01)
*G06F 21/31* (2013.01)
(Continued)

(52) U.S. Cl.
CPC ............. *G07C 13/00* (2013.01); *G06F 21/31* (2013.01); *G06F 21/64* (2013.01); *H04L 9/3247* (2013.01);
(Continued)

(58) Field of Classification Search
CPC .......................... H04L 2209/463; G07C 13/00
See application file for complete search history.

(56) References Cited

U.S. PATENT DOCUMENTS 6,021,200 A  2/2000 Fischer
6,061,449 A  5/2000 Candelore et al.
(Continued)

FOREIGN PATENT DOCUMENTS

CN       1236132 A   11/1999
CN     106790253 A    5/2017
(Continued)

OTHER PUBLICATIONS

Antonopoulos, "Mastering Bitcoin," O'Reilly Media, Inc., all pages. (Year: 2014).
(Continued)

*Primary Examiner* — Jacob C. Coppola
(74) *Attorney, Agent, or Firm* — GREENBLUM & BERNSTEIN, P.L.C.

(57) ABSTRACT

A method for controlling one of voting servers in an electronic voting system is provided. The method includes receiving, from a terminal, transaction data including voting data, and determining, by a processor, a block to include the transaction data from among multiple blocks. The method further includes generating, using the processor, the block including the transaction data, and connecting the block to a blockchain, the blockchain being stored in a memory.

11 Claims, 14 Drawing Sheets

Related U.S. Application Data

(60) Provisional application No. 62/559,038, filed on Sep. 15, 2017.

(51) Int. Cl.
  *G06F 21/64* (2013.01)
  *H04L 9/32* (2006.01)
  *G06Q 50/26* (2012.01)
  *H04L 9/00* (2022.01)

(52) U.S. Cl.
  CPC ......... *G06Q 50/26* (2013.01); *G06Q 2220/00* (2013.01); *G06Q 2230/00* (2013.01); *H04L 9/3228* (2013.01); *H04L 9/3239* (2013.01); *H04L 9/50* (2022.05); *H04L 2209/463* (2013.01)

(56) References Cited

U.S. PATENT DOCUMENTS

| | | | |
|---|---|---|---|
| 10,185,595 B1 * | 1/2019 | Ramatchandirane | H04L 9/3236 |
| 10,546,296 B2 | 1/2020 | Narasimhan | |
| 2006/0237535 A1 | 10/2006 | Watson | |
| 2006/0289638 A1 | 12/2006 | Schilling | |
| 2008/0105742 A1 | 5/2008 | Kim | |
| 2011/0113439 A1 | 5/2011 | Delegue et al. | |
| 2016/0027229 A1 | 1/2016 | Spanos | |
| 2017/0017954 A1 | 1/2017 | McDonough | |
| 2017/0046689 A1 | 2/2017 | Lohe | |
| 2017/0048209 A1 | 2/2017 | Lohe et al. | |
| 2017/0048234 A1 | 2/2017 | Lohe | |
| 2017/0048235 A1 | 2/2017 | Lohe | |
| 2017/0109955 A1 | 4/2017 | Ernest | |
| 2017/0232300 A1 | 8/2017 | Tran | |
| 2017/0300978 A1 | 10/2017 | Narasimhan | |
| 2019/0036932 A1 | 1/2019 | Bathen | |
| 2019/0088062 A1 | 3/2019 | Unagami | |
| 2019/0088063 A1 | 3/2019 | Unagami | |
| 2019/0147438 A1 * | 5/2019 | Micali | G06Q 20/3825 705/71 |

FOREIGN PATENT DOCUMENTS

| | | | |
|---|---|---|---|
| EP | 908810 | A2 | 4/1999 |
| EP | 1571777 | A1 | 9/2005 |
| EP | 3364351 | | 8/2018 |
| EP | 3127275 | | 1/2019 |
| EP | 3429122 | A1 | 1/2019 |
| EP | 3457622 | | 3/2019 |
| JP | 2005-293330 | A | 10/2005 |
| JP | 2011-517825 | | 6/2011 |
| WO | 2005004023 | | 1/2005 |
| WO | WO-2017192837 | A1 * | 11/2017 ........... G06Q 20/065 |

OTHER PUBLICATIONS

Navya et al., "Electronic voting machine based on Blockchain technology and Aadhar verification," International Journal of Advance Research, Ideas and Innovations in Technology, vol. 4, Issue 2, posted Feb. 28, 2018, all pages. (Year: 2018).

Tarasov et al., "The Future of E-Voting," IADIS International Journal on Computer Science and Information Systems, vol. 12, No. 2, pp. 148-165. (Year: 2017).

Hanifatunnisa et al., "Blockchain Based E-Voting Recording System Design," IEEE, all pages. (Year: 2017).

Mudliar et al., "A Comprehensive Integration of National Identity with Blockchain Technology," 2018 International Conference on Communication, Information & Computing Technology (ICCICT), Feb. 2-3, Mumbai, India, IEEE, all pages. (Year: 2018).

Shaheen et al., "Temper Proof Data Distribution for Universal Verifiability and Accuracy in Electoral Process Using Blockchain," all pages. (Year: 2017).

The Extended European Search Report dated Feb. 1, 2019 for European Patent Application No. 18191275.9.

Shigeichiro Yamasaki, "Blockchain based Electric Voting System for Corrective Intelligence", IPSJ Magazine, vol. 57, No. 12, Nov. 15, 2016, pp. 1204-1209 (Partial Translation).

Communication pursuant to Article 94(3) EPC dated Sep. 16, 2021 for European Patent Application No. 18191275.9.

English Translation of Chinese Search Report dated Sep. 3, 2021 for Chinese Patent Application No. 201811054600.0.

\* cited by examiner

FIG. 8

| ID | HOLDER |
|---|---|
| 100a | 100a |
| 100b | 100b |
| 100c | 100c |
| ... | ... |

FIG. 9A

| ID | HOLDER |
|---|---|
| 001 | 300a |
| 002 | 300b |
| 003 | 300c |
| ... | ... |

FIG. 9B

| ID | HOLDER |
|---|---|
| 001 | 200a |
| ... | ... |

FIG. 12

| ID | HOLDER |
|---|---|
| 100a | 200a |
| ... | ... |

FIG. 13A

| ID | HOLDER |
|---|---|
| 001 | 100a |
| ... | ... |

FIG. 13B

| ID | HOLDER |
|---|---|
| 001 | CANDIDATE X |
| ... | ... |

FIG. 14

| VOTING ID | VOTE | BLOCK ID |
|---|---|---|
| 101 | X | 2 |
| 102 | Y | 1 |
| 103 | X | 1 |
| 104 | Z | 1 |
| 105 | Z | 3 |
| 106 | Y | 2 |
| 107 | X | 3 |

ELECTRONIC VOTING SYSTEM AND CONTROL METHOD

CROSS-REFERENCE TO RELATED APPLICATIONS

This application is a Continuation of U.S. patent application Ser. No. 16/108,134, filed on Aug. 22, 2018, which claims the benefit of Japanese Application No. 2018-093921, filed on May 15, 2018, which in turn claims priority to U.S. Provisional Patent Application No. 62/559,038, filed Sep. 15, 2017. The disclosure of each of these documents, including the specification, drawings, and claims, is incorporated herein by reference in its entirety.

BACKGROUND

1. Technical Field

The present disclosure relates to an electronic voting system and a control method.

2. Description of the Related Art

During these years, some local governments are holding electronic voting. In an electronic voting system, authentication information regarding voters and votes cast by the voters should not be associated with each other in order to keep the votes secret.

In an electronic voting system disclosed in Japanese Unexamined Patent Application Publication (Translation of PCT Application) No. 2011-517825, a voting participation ticket is transmitted to a communication terminal used to authenticate a voter, and the communication terminal anonymizes and transmits the voting participation ticket in order to keep the voter anonymous.

In addition, the electronic voting system needs to be reliable, and stored votes need to be resistant to alteration. In "Blockchain-based Electronic Voting System for Collective Intelligence", Information Processing, vol. 57, issue 12, pp. 1204-1209, a blockchain is used to make a system reliable and prevent alteration to votes.

SUMMARY

When a blockchain is used to manage voting in an electronic voting system, voters and votes are undesirably associated with each other if a blockchain including voting results is disclosed. As a result, a secret ballot is not achieved.

One non-limiting and exemplary embodiment provides an electronic voting system and the like that achieve a secret ballot.

In one general aspect, the techniques disclosed here feature an electronic voting system including a terminal including a processor and a memory, a plurality of authentication servers, and a plurality of voting servers. Each of the plurality of authentication servers including a memory and a processor. Each of the plurality of voting servers including a memory and a processor. One of the plurality of authentication servers is configured to receive authentication data from the terminal, authenticate a voter using the authentication data, the authentication data including a first identifier associated with the voter and authentication information regarding the voter, store a first blockchain including first transaction data indicating that the voter has been authenticated, and synchronize the first blockchain with at least one other authentication server among the plurality of authentication servers. One of the plurality of voting servers is configured to receive voting data from the terminal, the voting data including a second identifier associated with a vote cast by the voter and voting information indicating the vote, the second identifier being different from the first identifier, generate, when the voting data is received from the terminal, second transaction data indicating the vote, determine, from among a plurality of blocks, a block to include the second transaction data, generate the block including the second transaction data, connect the block to a second blockchain, store the second blockchain, and synchronize the second blockchain with at least one other voting server among the plurality of voting servers. The terminal is configured to generate the authentication data, transmit the authentication data to the one of the plurality of authentication servers, generate the voting data authentication performed by the one of the plurality of authentication servers is successfully completed, and transmit the voting data to the one of the plurality of voting servers.

According to the present disclosure, a secret ballot is achieved.

It should be noted that general or specific embodiments may be implemented as a system, a method, an integrated circuit (IC), a computer program, a computer-readable storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating holders of authentication coins during the initialization process according to the embodiment;

FIGS. 9A and 9B are diagrams illustrating holders of voting coins during the initialization process according to the embodiment;

FIG. 12 is a diagram illustrating holders of authentication coins during the voting process according to the embodiment;

FIGS. 13A and 13B are diagrams illustrating holders of voting coins during the voting process according to the embodiment;

FIG. 14 is a diagram illustrating block identifiers (IDs) of blocks to include voting transaction data according to the embodiment;

DETAILED DESCRIPTION

Figure 1:
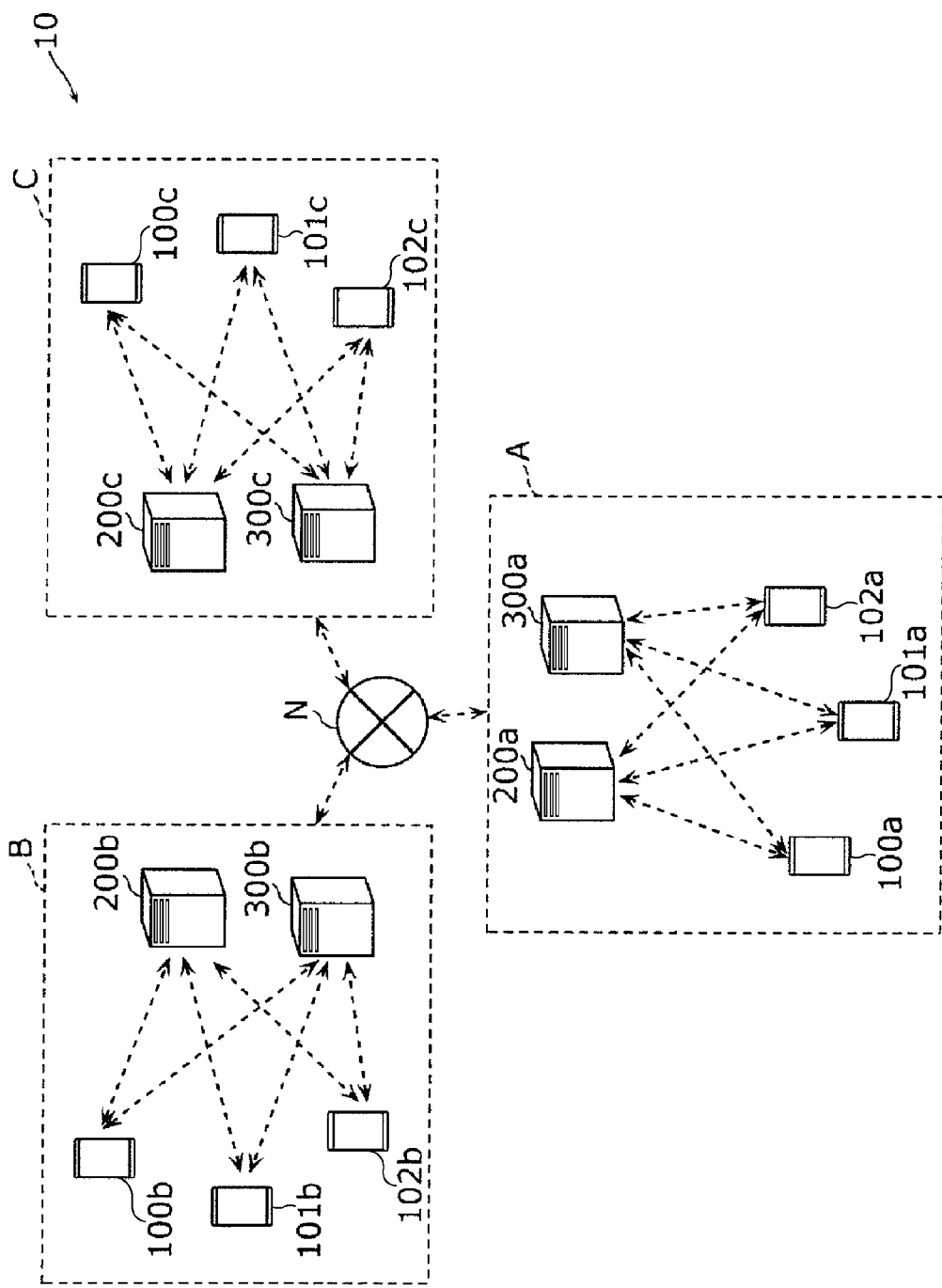
FIG. 1 is a schematic diagram illustrating the configuration of an electronic voting system according to an embodiment.

An electronic voting system according to an aspect of the present disclosure is an electronic voting system including a terminal including a processor and a memory, a plurality of authentication servers, each of the plurality of authentication servers including a memory and a processor, and a plurality of voting servers, each of the plurality of voting servers including a memory and a processor. One of the plurality of authentication servers is configured to receive authentication data from the terminal, authenticate a voter using the authentication data, the authentication data including a first identifier associated with the voter and authentication information regarding the voter, store a first blockchain including first transaction data indicating that the voter has been authenticated, and synchronize the first blockchain with at least one other authentication server among the plurality of authentication servers. One of the plurality of voting servers is configured to receive voting data from the terminal, the voting data including a second identifier associated with a vote cast by the voter and voting information indicating the vote, the second identifier being different from the first identifier, generate, when the voting data is received from the terminal, second transaction data indicating the vote, determine, from among a plurality of blocks, a block to include the second transaction data, generate the block including the second transaction data, connect the block to a second blockchain, store the second blockchain, and synchronize the second blockchain with at least one other voting server among the plurality of voting servers. The terminal is configured to generate the authentication data, transmit the authentication data to the one of the plurality of authentication servers, generate the voting data after authentication performed by the one of the plurality of authentication servers is successfully completed, and transmit the voting data to the one of the plurality of voting servers.

According to this aspect, the electronic voting system uses data including IDs different between authentication of a legitimate voter and voting performed after the authentication. As a result, even after a result of the authentication and a vote are disclosed after an election, for example, a voter who has cast the vote is not identified. In addition, by managing data indicating the authentication and data indicating the vote using different blockchains, alteration to the data can be suppressed. Furthermore, since blocks storing votes are generated in unique order and connected to one another in a blockchain storing the votes, the votes cast by voters are not identified. The electronic voting system therefore achieves a secret ballot.

For example, the block to include the second transaction data is randomly determined from among the plurality of blocks.

According to this aspect, the electronic voting system includes voting transaction data in blocks in random order and stores the voting transaction data in a blockchain. Since the order of voting transaction data is random, votes, that is, correspondences between voters and candidates are not identified in the electronic voting system, even if a blockchain storing the votes is disclosed. The electronic voting system therefore achieves a secret ballot.

For example, the block is determined, from among the plurality of blocks, based on the information received from the terminal.

According to this aspect, the electronic voting system includes voting transaction data in a block determined on the basis of information received from the terminal and stores the voting transaction data in a blockchain. Since the electronic voting system determines a block to include voting transaction data on the basis of information set independently of the voting servers, independence between order in which voters have voted and order of blocks storing votes further increases.

For example, the one of the plurality of voting servers is further configured to share, with the at least one other voting server, the block that is determined to include the second transaction data.

According to this aspect, the electronic voting system can use the same block to include voting transaction data between the voting servers.

In addition, an electronic voting system according to an aspect of the present disclosure is an electronic voting system including a plurality of authentication servers, each of the plurality of authentication servers including a memory and a processor, and a plurality of voting servers, each of the plurality of voting servers including a memory and a processor. One of the plurality of authentication servers is configured to receive authentication data from the terminal, the authentication data including a first identifier associated with a voter and authentication information regarding the voter, authenticate the voter using the authentication data, store a first blockchain including first transaction data indicating that the voter has been authenticated, and synchronize the first blockchain with at least one other authentication server among the plurality among the plurality of authentication servers. One of the plurality of voting servers is configured to receive voting data from the terminal, the voting data including a second identifier associated with a vote cast by the voter and voting information indicating the vote, the second identifier being different from the first identifier, generate, when the voting data is received from the terminal, second transaction data indicating the vote included in the voting data, determine, from among a plurality of blocks, a block to include the second transaction data, generate the block including the second transaction data, connect the block to a second blockchain, store the second blockchain, and synchronize the second blockchain with at least one other voting server among the plurality of voting servers.

According to this aspect, as with the foregoing electronic voting system, the electronic voting system achieves a secret ballot using a terminal that is not included therein.

In addition, a method for controlling a voting server according to an aspect of the present disclosure is a method for controlling a voting server among a plurality of voting servers in an electronic voting system, the plurality of voting servers including at least one other voting server. The method includes receiving, using a processor of the voting server, voting data from a terminal, the voting data including a vote-cast identifier associated with a vote cast by a voter and voting information indicating the vote, a voter identifier associated with the voter being different from the vote-cast identifier, generating, using the processor, when the voting data is received from the terminal, transaction data indicating the vote included in the voting data, determining, using the processor, a block to include the transaction data from among a plurality of blocks, generating, using the processor, the block including the transaction data, connecting, using the processor, the block to a blockchain, storing the blockchain in a memory of the voting server, and synchronizing, using the processor, the blockchain with the at least one other voting server.

As a result, the same advantageous effects as those produced by the foregoing electronic voting system are produced.

In addition, a method for controlling an electronic voting system according to an aspect of the present disclosure is a method for controlling an electronic voting system including a terminal, a plurality of authentication servers, and a plurality of voting servers, the plurality of authentication servers including an authentication server and at least one other authentication server, the plurality of voting servers including a voting server and at least one other voting server. The method includes receiving, using a processor of the authentication server, authentication data from the terminal, the authentication data including a first identifier associated with a voter and authentication information regarding the voter, authenticating the voter using the processor and the authentication data, storing a first blockchain in a memory of the authentication server, the first blockchain including first transaction data indicating that the voter has been authenticated, synchronizing, using the processor, the first blockchain with the at least one other authentication server, receiving, using a processor of the voting server, voting data from the terminal, the voting data including a second identifier associated with a vote cast by the voter and voting information indicating the vote, the first identifier being different from the second identifier, generating, using the processor of the voting server, when the voting data is received from the terminal, second transaction data indicating the vote included in the voting data, determining, using the processor of the voting server, a block to include the second transaction data from among a plurality of blocks, generating, using the processor of the voting server, the block including the second transaction data, connecting, using the processor of the voting server, the block to a second blockchain, storing the second blockchain in a memory of the voting server, synchronizing the second blockchain with the at least one other voting server, generating, using a processor of the terminal, the authentication data, transmitting, using the processor of the terminal, the authentication data to the authentication server, generating, using the processor of the terminal, the voting data after authentication performed by the authentication server is successfully completed, and transmitting, using the processor of the terminal, the voting data to the voting server.

As a result, the same advantageous effects as those produced by the foregoing electronic voting system are produced.

It should be noted that these general or specific aspects may be implemented as a system, a method, an IC, a computer program, a computer-readable recording medium such as a CD-ROM, or any selective combination thereof.

An embodiment will be specifically described hereinafter with reference to the drawings.

The embodiment that will be described hereinafter is a general or specific example. Values, shapes, materials, components, arrangement positions and connection modes of the components, steps, the order of the steps, and the like mentioned in the following embodiment are examples, and do not limit the present disclosure. Among the components described in the following embodiment, ones not described in the independent claims, which define broadest concepts, will be described as arbitrary components.

EMBODIMENT

An electronic voting system that achieves a secret ballot will be described in the present embodiment.
1. System Configuration The electronic voting system is a system for enabling voters to electronically vote using voting terminals. The electronic voting system performs an authentication process regarding voting between the voting terminals and authentication servers and then performs a voting process between the voting terminals and voting servers. A period in which the electronic voting system receives votes from the voters will be referred to as a "voting period". People who vote using the electronic voting system will be referred to as "voters", and people who have a right to vote will be referred to as "electors".

The electronic voting system will be described hereinafter with reference to the drawings.
1.1 Overall Configuration of Electronic Voting System 10

FIG. 1 is a diagram illustrating the configuration of an electronic voting system 10 according to the present embodiment. The electronic voting system 10 includes voting terminals 100a, 101a, 102a, 100b, 101b, 102b, 100c, 101c, and 102c (also referred to as "voting terminals 100a to 102c"), authentication servers 200a, 200b, and 200c (also referred to as "authentication servers 200a to 200c"), and voting servers 300a, 300b, and 300c (also referred to as "voting servers 300a to 300c"). These components are connected to one another through a network N. Alternatively, the electronic voting system 10 need not include the voting terminals 100a to 102c and may use terminals external to the electronic voting system 10, namely terminals owned by the voters, for example, as the voting terminals 100a to 102c, instead.

The authentication servers 200a to 200c authenticate voters and manage information indicating authenticated voters. The authentication servers 200a to 200c use a known blockchain technique for the authentication of voters and the management of information. That is, the authentication servers 200a to 200c manage a transaction history of virtual transactions using a blockchain. Coins (also referred to as "authentication coins") will be subjected to virtual transactions in the following description, but virtual transactions need not employ coins. In addition, the authentication servers 200a to 200c share a blockchain storing a transaction history of authentication coins and prevent alteration to the transaction history by mutually approving the blockchain. The authentication coins are generated by the authentication servers 200*a* to 200*c* and transmitted to the voting terminals 100*a* to 102*c*. After voters are successfully authenticated, the voting terminals 100*a* to 102*c* transmit the authentication coins to the authentication servers 200*a* to 200*c*. The transmission of the authentication coins will be referred to as an "authentication transaction". The authentication coins are virtual coins, and the authentication servers 200*a* to 200*c* manage a transaction history of the authentication coins. The authentication coins each include an ID for identifying itself. The I Ds of the authentication coins are associated with I Ds assigned to electors in one-to-one correspondence. The IDs of the authentication coins will be referred to as "authentication IDs".

The voting servers 300*a* to 300*c* manage votes cast by the voters. The voting servers 300*a* to 300*c* use a known blockchain technique to manage the votes. That is, the voting servers 300*a* to 300*c* manage a transaction history of virtual transactions using a blockchain. Coins (also referred to as "voting coins") will be subjected to virtual transactions in the following description, but virtual transactions need not employ coins. In addition, the voting servers 300*a* to 300*c* share a blockchain storing a transaction history of voting coins and prevent alteration to the transaction history by mutually approving the blockchain. The authentication coins are generated by the voting servers 300*a* to 300*c* and transmitted to the voting terminals 100*a* to 102*c* through the authentication servers 200*a* to 200*c*. The transmission of the voting coins will be referred to as a "voting transaction" and transmission of the voting coins to candidates from the voting terminals 100*a* to 102*c* corresponds to voting in an election. The voting coins are virtual coins, and the voting servers 300*a* to 300*c* manage a transaction history of the voting coins. The voting terminals 100*a* to 102*c* transmit the voting coins to candidates during voting by the voters. The number of voting coins obtained by the candidates is the number of votes obtained by the candidates in electronic voting. The voting coins correspond to ballots used in a conventional election. The voting coins each include an ID for identifying itself. The IDs of the voting coins are associated with votes cast by the voters in one-to-one correspondence. The IDs of the voting coins will be referred to as "voting IDs".

The IDs of the authentication coins and the IDs of the voting coins are different from each other.

The electronic voting system 10 is, for example, divided into three subsystems A, B, and C. The number of subsystems is not limited to three, and may be any number equal to or larger than 2.

The electronic voting system 10 distributes processes among the authentication servers 200*a* to 200*c* and the voting servers 300*a* to 300*c* and shares information so that the electronic voting system 10 can be used in a national or local election. The authentication servers 200*a* to 200*c* and the voting servers 300*a* to 300*c* prevent alteration to a transaction history by mutually approving the blockchain.

When voters vote using the voting terminal 100*a* provided at a polling station, for example, the authentication server 200*a* and the voting server 300*a* are also provided at the polling station. In this case, the subsystems A, B, and C are provided for polling stations. In a national election conducted in Japan, for example, tens of thousands of subsystems are used.

When voters vote at home through a network, on the other hand, the authentication server 200*a* and the voting server 300*a* may be provided for each attribute of electors (gender, place of residence, occupation, etc.). In this case, the subsystems A, B, and C are provided in accordance with the attributes of the electors.

Figure 2:
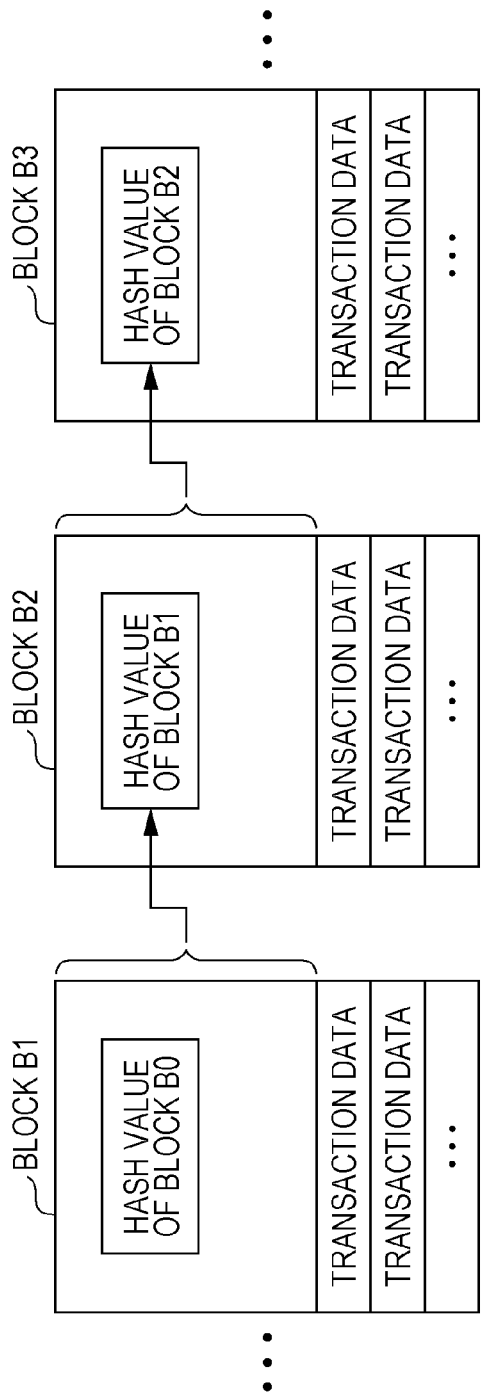
FIG. 2 is a diagram illustrating the data structure of a blockchain.

FIG. 2 is a diagram illustrating the data structure of a blockchain.

A blockchain is a series of blocks, which are recording units, connected to one another as a chain. Each block includes a plurality of pieces of transaction data and a hash value of a previous block. More specifically, a block B2 includes a hash value of a previous block B1. A block B3 includes, as a hash value of the block B2, a hash value calculated from a plurality of pieces of transaction data included in the block B2 and the hash value of the block B1. Alteration to recorded transaction data is thus effectively prevented by connecting blocks as a chain while including the content of previous blocks as hash values.

If past transaction data is altered, hash values of blocks change. In reality, therefore, it is extremely difficult to make the altered block look like an original one, because all subsequent blocks need to be corrected.

Each piece of transaction data indicates generation and transmission of a new coin. The coin corresponds to an authentication coin or a voting coin.

Figure 3:
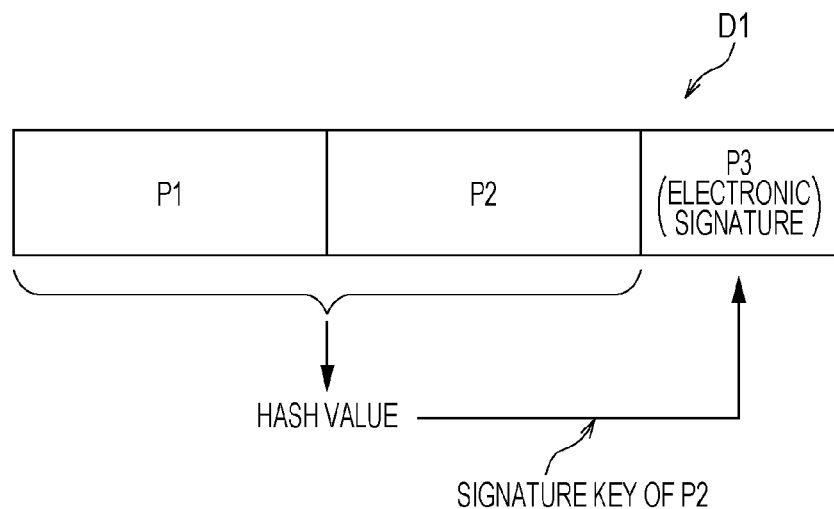
FIG. 3 is a diagram illustrating the data structure of transaction data.

FIG. 3 is a first diagram illustrating the data structure of transaction data.

The transaction data illustrated in FIG. 3 is an example of transaction data D1 indicating that a holder of a coin transmits the coin to a destination. The transaction data D1 includes an address P1 indicating the holder, an address P2 indicating the destination, and an electronic signature P3 generated using a signature key of the holder for hash values of the addresses P1 and P2. Transaction data is also generated when a new coin is generated. In transaction data when a new coin is generated, the address P1 is blank.

The voting terminal 100*a*, the authentication server 200*a*, and the voting server 300*a* will be described hereinafter in this order. The same holds for the other voting terminals, the other authentication servers, and the other voting servers.

1.2 Configuration of Voting Terminal 100*a*

The voting terminal 100*a* receives authentication information regarding a voter and a vote input by the voter and displays various pieces of information. The voting terminal 100*a* may be a mobile terminal owned by the voter (more specifically, a mobile phone terminal, a smartphone, or a personal computer) or a terminal prepared in a polling station.

Figure 4:
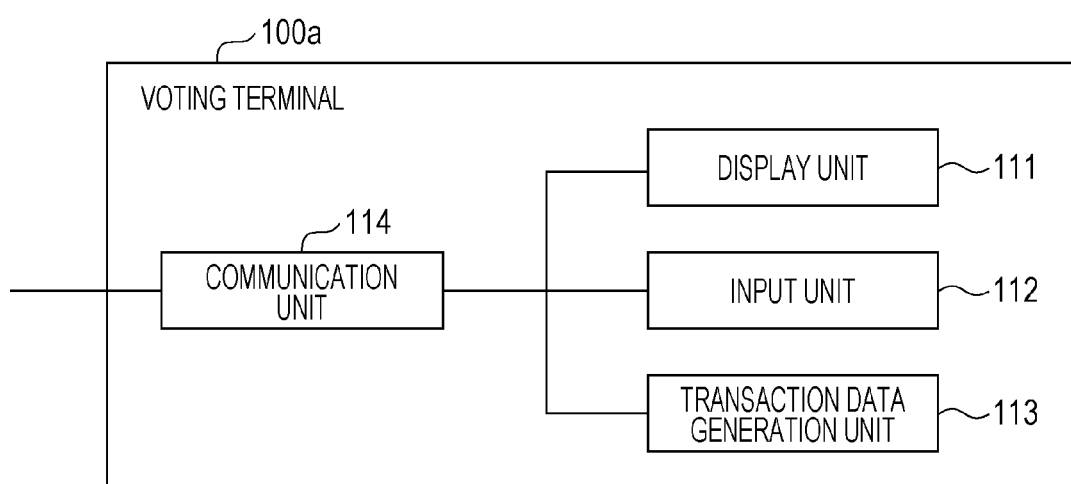
FIG. 4 is a block diagram illustrating the configuration of a voting terminal according to the embodiment.

FIG. 4 is a block diagram illustrating the configuration of the voting terminal 100*a* according to the present embodiment. The voting terminals 100*b* and 100*c* have the same configuration. The voting terminal 100*a* includes a display unit 111, an input unit 112, a transaction data generation section 113, and a communication unit 114. The voting terminal 100*a* can be achieved when a processor executes a certain program using a memory.

The display unit 111 is a display device for displaying a voting screen. The term "screen" refers to a screen displayed, as an image, on a display device such as a liquid crystal display or an organic electroluminescent (EL) display. The same holds in the following description.

The input unit 112 receives authentication information and a vote from the voter during voting.

The transaction data generation section 113 generates authentication data for authenticating the voter and voting data for voting performed by the voter. The transaction data generation section 113 generates authentication transaction data for transmitting an authentication coin during authentication and voting transaction data for transmitting a voting coin during voting performed by the voter. The authentication data includes authentication information including an authentication ID unique to the voter and an electronic signature (also simply referred to as a "signature") of the voting terminal 100a. The electronic signature is generated using a signature key for a hash value of the authentication information. The authentication transaction data is transaction data indicating a transaction for transmitting an authentication coin from the voting terminal 100a to the authentication server 200a. The authentication transaction data will also be referred to as "first transaction data".

The voting data includes a vote in electronic voting and a signature of the voting terminal 100a. The vote is specifically information indicating a candidate to vote for or information indicating confidence or non-confidence. The voting transaction data is transaction data indicating a transaction for transmitting a voting coin, which has been transmitted from the authentication server 200a, to a candidate. The voting transaction data will also be referred to as "second transaction data".

The transaction data generation section 113 generates authentication data and transmits the generated authentication data to the authentication server 200a. After the transaction data generation section 113 transmits the authentication data to the authentication server 200a and the authentication server 200a successfully authenticates the voter, the transaction data generation section 113 generates voting data and transmits the voting data to the voting server 300a.

The signature key used by the voting terminal 100a to generate a signature may be held by the voting terminal 100a in advance or, when authentication information is received from the voter, obtained from the authentication server 200a.

The communication unit 114 is a communication interface for communicating with the authentication server 200a and the voting server 300a. The communication may be based on transport layer security (TLS). In this case, the communication unit 114 may hold a private key for TLS communication.

1.3 Configuration of Authentication Server 200a

Figure 5:
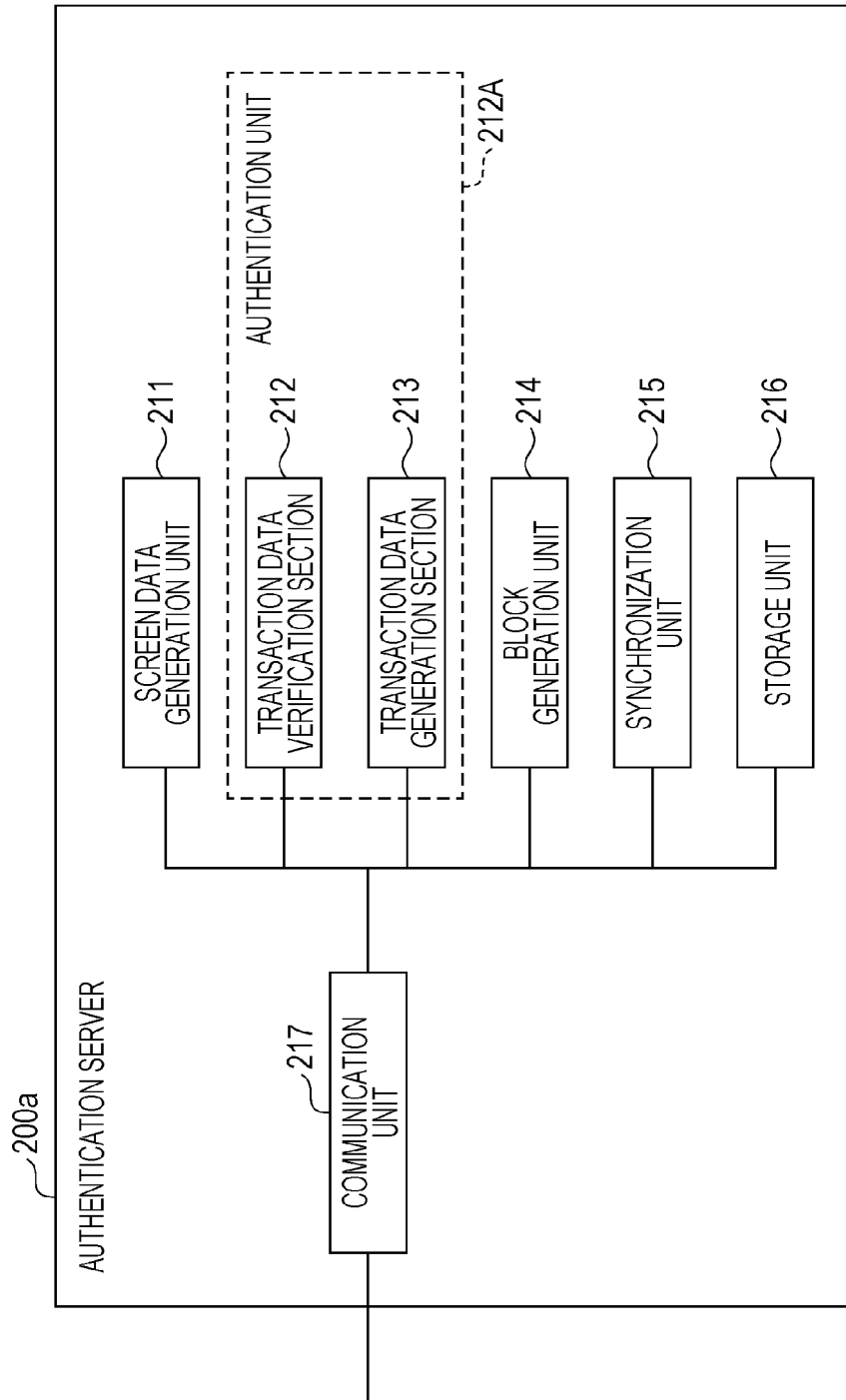
FIG. 5 is a block diagram illustrating the configuration of an authentication server according to the embodiment.

FIG. 5 is a block diagram illustrating the configuration of the authentication server 200a according to the present embodiment. The authentication servers 200b and 200c have the same configuration. The authentication server 200a includes a screen data generation unit 211, a transaction data verification section 212, a transaction data generation section 213, a block generation unit 214, a synchronization unit 215, a storage unit 216, and a communication unit 217. The authentication servers 200a to 200c are achieved when a processor executes a certain program using a memory.

When the voting terminal 100a has accessed the screen data generation unit 211 for authentication, the screen data generation unit 211 generates screen data for drawing an authentication screen. More specifically, the screen data generation unit 211 generates screen data for drawing, on the voting terminal 100a, a screen for receiving authentication information from the voter.

The transaction data verification section 212 receives authentication transaction data from the voting terminal 100a and verifies the received authentication transaction data. After receiving authentication transaction data from the voting terminal 100a, the transaction data verification section 212 verifies whether a signature included in the received authentication transaction data is legitimate and whether the authentication information is legitimate. In the verification of the legitimacy of the authentication information, for example, whether the authentication information has been issued by the electronic voting system 10 in advance and whether the authentication information has been used twice or more during the voting period are verified. Whether the authentication information has been used twice or more is verified by referring to the storage unit 216 and determining whether the storage unit 216 stores an authentication transaction based on the authentication information. If verifying that the authentication information is legitimate as a result of the verification, the transaction data verification section 212 stores the authentication transaction data in the storage unit 216. The synchronization unit 215 transmits the legitimate authentication transaction data to the authentication servers 200b and 200c for synchronization.

After receiving the voting transaction data from the voting server 300a, the transaction data verification section 212 verifies whether a signature included in the voting transaction data is legitimate.

The transaction data generation section 213 generates authentication transaction data regarding an authentication transaction. The transaction data generation section 213 generates, in an initialization process, authentication transaction data for generating new authentication coins as many as the number of electors. Holders of the authentication coins at this moment are the electors.

The transaction data generation section 213 also generates voting transaction data for transmitting a voting coin, which has originally be transmitted from the voting server 300a, to the voting terminal 100a. The transaction data generation section 213 corresponds to a first transaction data generator.

The block generation unit 214 implements a consensus algorithm between the authentication servers 200a to 200c. The consensus algorithm may be one called "practical Byzantine fault tolerance (PBFT)" or may be another known consensus algorithm. If a consensus is reached about one or more authentication transactions using the consensus algorithm, the block generation unit 214 generates a block including authentication transaction data and stores the block in the storage unit 216. The block generation unit 214 then connects the generated block to a blockchain stored in the storage unit 216. The block generation unit 214 corresponds to a first block generator.

The synchronization unit 215 synchronizes blocks of a blockchain and authentication transaction data between the authentication servers 200a to 200c. The blocks of the blockchain are synchronized between the authentication servers 200a to 200c in a peer-to-peer manner. When authentication transaction data has been received from the voting terminal 100a and the transaction data verification section 212 has verified the legitimacy of the authentication transaction data, for example, the synchronization unit 215 transmits copies of the authentication transaction data to the authentication servers 200b and 200c in order to store the verified authentication transaction data in the storage units 216 of the authentication servers 200b and 200c. When the synchronization unit 215 has received authentication transaction data from the authentication servers 200b and 200c, on the other hand, the synchronization unit 215 stores the received authentication transaction data in the storage unit 216.

The storage unit 216 is a storage device storing authentication transaction data and blocks of a blockchain. The blocks stored in the storage unit 216 are provided with IDs for identifying the blocks. The blockchain stored in the storage unit 216 will be referred to as a "first blockchain".

The communication unit 217 is a communication interface for communicating with the voting terminal 100a and the voting server 300a. The communication may be based on TLS. In this case, the communication unit 217 may hold a private key for TLS communication.

The transaction data verification section 212 and the transaction data generation section 213 correspond to an authentication unit 212A that receives, from the voting terminal 100a, authentication data including the authentication ID (i.e., a first ID) associated with the voter and authentication information regarding the voter and that authenticates the voter using the received authentication data.

1.4 Configuration of Voting Server 300a

Figure 6:
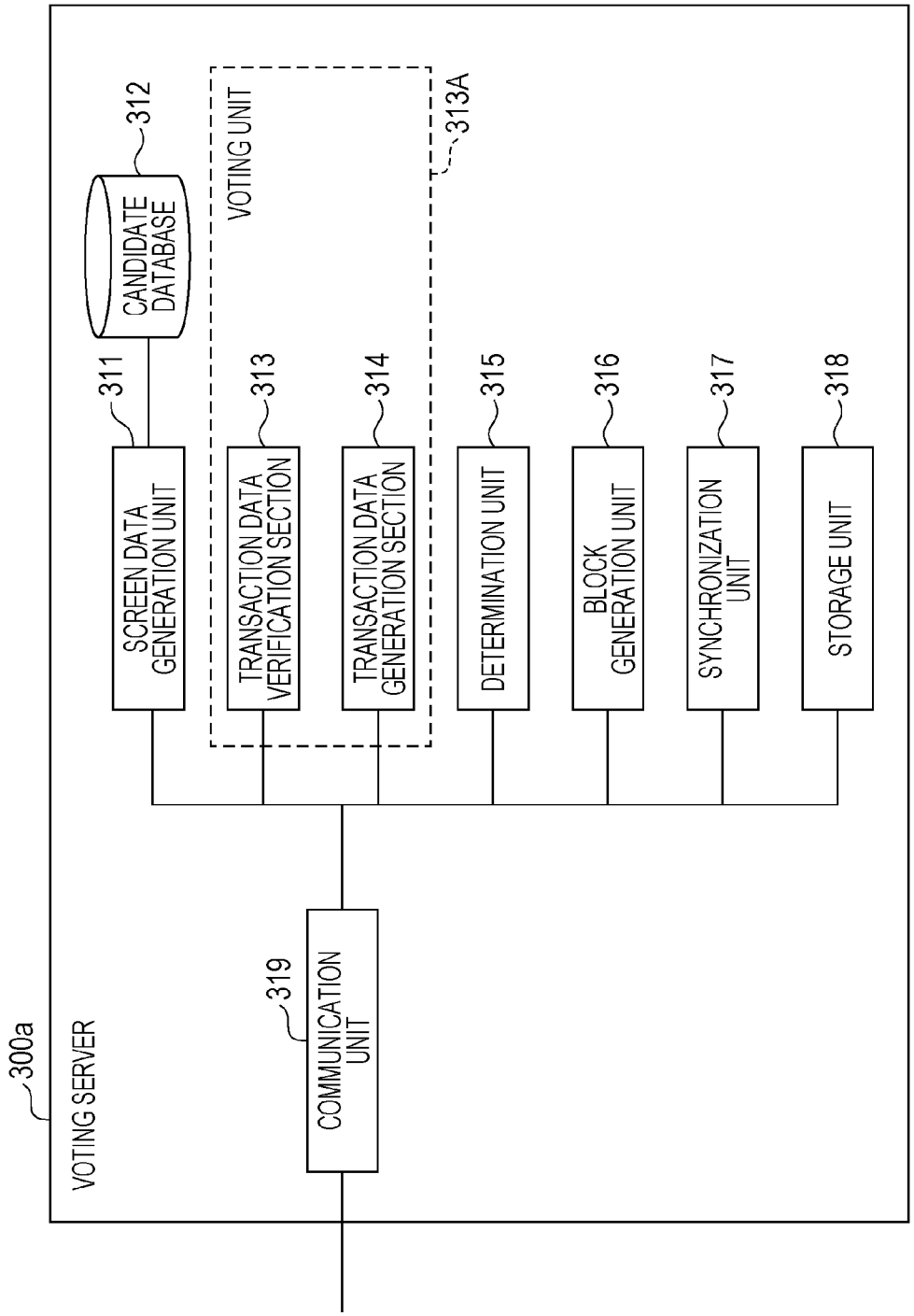
FIG. 6 is a block diagram illustrating the configuration of a voting server according to the embodiment.

FIG. 6 is a block diagram illustrating the configuration of the voting server 300a according to the present embodiment. The voting servers 300b and 300c have the same configuration. The voting server 300a includes a screen data generation unit 311, a candidate database 312, a transaction data verification section 313, a transaction data generation section 314, a determination unit 315, a block generation unit 316, a synchronization unit 317, a storage unit 318, and a communication unit 319. The voting server 300a can be achieved when a processor executes a certain program using a memory.

The voting terminal 100a accesses the screen data generation unit 311 for voting, and the screen data generation unit 311 generates screen data, which is drawing data for drawing a voting screen. More specifically, the screen data generation unit 311 obtains information regarding candidates from the candidate database 312 and generates screen data, which is drawing data for drawing a screen for receiving voting information from the voter, the screen being displayed on the voting terminal 100a.

The candidate database 312 is a database storing information regarding candidates. The candidate database 312 at least stores information for identifying candidates. More specifically, the candidate database 312 stores, as the information for identifying candidates, character strings indicating names of the candidates and may also store images of the candidates' faces or the like.

The transaction data verification section 313 receives voting transaction data from the voting terminal 100a and verifies the received voting transaction data. The transaction data verification section 313 verifies whether a signature included in the voting transaction data is legitimate and whether voting information is legitimate. In the verification of the legitimacy of the voting information, for example, whether the voting information has been issued by the electronic voting system 10 in advance and whether the voting information has been used twice or more during the voting period are verified. Whether the voting information has been used twice or more is verified by referring to the storage unit 318 and determining whether the storage unit 318 stores the voting information. If verifying that the voting information is legitimate as a result of the verification, the transaction data verification section 313 stores the voting transaction data in the storage unit 318. The synchronization unit 317 transmits the legitimate voting transaction data to the voting servers 300b and 300c for synchronization.

The transaction data generation section 314 generates voting transaction data regarding a voting transaction. The transaction data generation section 314 generates, in an initialization process, voting transaction data for generating new voting coins as many as the number of electors. A holder of the voting coins at this moment is the voting server 300a. Next, the transaction data generation section 314 generates voting transaction data (corresponds to third transaction data) for transmitting the voting coins to the authentication server 200a. The generated voting transaction data includes information indicating a holder of the voting coins (i.e., information indicating the authentication server 200a) and a signature of the voting server 300a. After the voting transaction data for transmitting the voting coins to the authentication server 200a is generated, the authentication server 200a holds the voting coins. The transaction data generation section 314 corresponds to a second transaction data generator.

The determination unit 315 determines, among a plurality of blocks generated by the block generation unit 316, a block to include one or more pieces of voting transaction data generated by the transaction data generation section 314. By determining a block to include voting transaction data in this manner, order in which the voting transaction data is stored in a blockchain becomes different from order in which voters have voted. In other words, the order in which voting transaction data is stored in a blockchain becomes independent of the order in which voters have voted.

For example, the determination unit 315 may determine that, a random one of a plurality of second blocks generated by the block generation unit 316 is to include one or more pieces of voting transaction data generated by the transaction data generation section 314. The random block may be determined using random numbers. Alternatively, the determination unit 315 may determine that one of a plurality of second blocks generated by the block generation unit 316 determined on the basis of information received from the voting terminal 100a is to include one or more pieces of voting transaction data generated by the transaction data generation section 314. Here, the information received from the voting terminal 100a can be, for example, a communication address such as a physical address or a logical address of the voting terminal 100a, random numbers generated by the voting terminal 100a, or the like.

In addition, the determination unit 315 causes the block generation unit 316 to generate a block determined in the above manner such that one or more pieces of voting transaction data generated by the transaction data generation section 314 is included in the block.

The block generation unit 316 implements a consensus algorithm between the voting servers 300a to 300c. The block generation unit 316 implements the consensus algorithm between the voting servers 300a to 300c on the basis of a request to implement the consensus algorithm transmitted from the determination unit 315 and a block ID of a block to be generated. The consensus algorithm may be PBFT or may be another known consensus algorithm. If a consensus is reached, using the consensus algorithm, about voting transaction data for which the criterion of anonymization is satisfied, the block generation unit 316 generates a block including voting transaction data and stores the block in the storage unit 318. The block generation unit 316 then connects the generated block to a blockchain stored in the storage unit 318. The block generation unit 316 corresponds to a second block generator.

The block generation unit 316 also generates a block (corresponds to a third block) including voting transaction data (third transaction data) for transmitting voting coins to the authentication server 200a and connects the generated block to the blockchain. The third transaction data indicates that the authentication unit 212A (transaction data verification section 212) has become able to authenticate the electors.

The block generation unit 316 also generates a block (corresponds to a fourth block) including voting transaction data (fourth transaction data) for transmitting the voting coins from the authentication server 200a to the voting terminal 100*a* and connects the generated fourth block to a second blockchain. The fourth transaction data indicates that, as a result of the authentication of the voters performed by the authentication server 200*a*, the voting terminal 100*a* has become able to receive votes from the voters.

The synchronization unit 317 synchronizes blocks of a blockchain and voting transaction data between the voting servers 300*a* to 300*c*. The blocks of the blockchain are synchronized between the voting servers 300*a* to 300*c* in a peer-to-peer manner. When voting transaction data has been received from the voting terminal 100*a* and the transaction data verification section 313 has verified the legitimacy of the voting transaction data, for example, the synchronization unit 317 transmits copies of the voting transaction data to the voting servers 300*b* and 300*c* in order to store the verified voting transaction data in the storage units 318 of the voting servers 300*b* and 300*c*. When the synchronization unit 317 has received voting transaction data from the voting servers 300*b* and 300*c*, on the other hand, the synchronization unit 317 stores the received voting transaction data in the storage unit 318.

The storage unit 318 is a storage device storing voting transaction data and blocks of a blockchain. The blockchain stored in the storage unit 318 will be referred to as a "second blockchain".

The communication unit 319 is a communication interface for communicating with the voting terminal 100*a* and the authentication server 200*a*. The communication may be based on TLS. In this case, the communication unit 319 may hold a private key for TLS communication.

The transaction data verification section 313 and the transaction data generation section 314 correspond to a voting unit 313A that receives, from the voting terminal 100*a*, voting data including voting IDs (i.e., second IDs) associated with votes cast by the voters and different from authentication IDs and voting information indicating the votes.

1.5 Voting Sequence between Voting Terminals and Servers

A process performed by the electronic voting system 10 will be described hereinafter. Here, a process will be described in which voters are authenticated between the voting terminals 100*a* to 102*c* and the authentication servers 200*a* to 200*c* using authentication coins and voting is performed between the voting terminals 100*a* to 102*c* and the voting servers 300*a* to 300*c* using voting coins. In order to allow only authenticated voters to vote, voting coins are transmitted to the voting terminal 100*a* through the authentication server 200*a*.

An initialization process, a voting process, an ending process, and a process for disclosing voting results will be described hereinafter in this order.

Initialization Process

Figure 7:
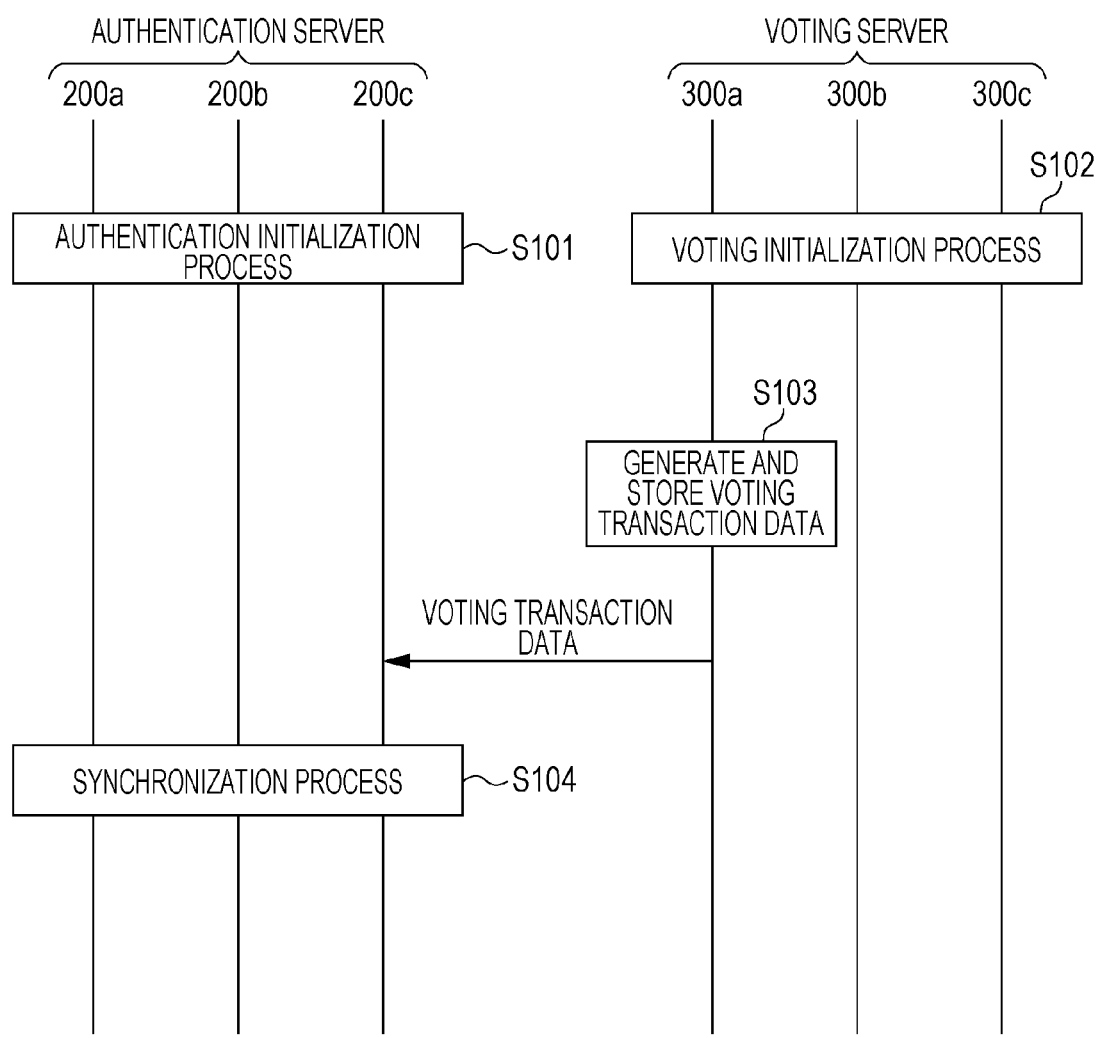
FIG. 7 is a sequence diagram illustrating an initialization process performed by the electronic voting system according to the embodiment.

FIG. 7 is a sequence diagram illustrating the initialization process performed by the electronic voting system 10 according to the present embodiment. FIGS. 8, 9A, and 9B are diagrams illustrating holders of authentication coins and voting coins during the initialization process according to the present embodiment. The holders of the authentication coins and the voting coins are managed by the authentication servers 200*a* to 200*c* and the voting servers 300*a* to 300*c*, respectively.

The initialization process illustrated in FIG. 7 is performed once before each election employing the electronic voting system 10.

In step S101, the authentication server 200*a* performs an authentication initialization process. In the authentication initialization process, authentication transaction data for generating authentication coins including IDs (also referred to as "elector IDs") distributed to electors in advance as authentication IDs is generated, and then a block including the generated authentication transaction data is generated. At this stage, holders of the authentication coins are electors identified on the basis of the elector IDs (refer to FIG. 8).

In step S102, the voting server 300*a* performs a voting initialization process. In the voting initialization process, voting transaction data for generating voting coins as many as the number of electors is generated, and then a block including the generated voting transaction data is generated. At this stage, a holder of all the voting coins is the voting server 300*a* (refer to FIG. 9A). IDs of the voting coins are character strings or values for uniquely identifying the voting coins and different from one another. The IDs of the voting coins may be randomly selected character strings or values. Since the IDs of the voting coins are character strings or values different from one another, whether a voting coin is used twice can be determined when a blockchain is referred to.

In step S103, the voting server 300*a* generates voting transaction data for transmitting the voting coins generated in step S102 to the authentication server 200*c* and then generates a block including the generated voting transaction data. The voting server 300*a* transmits the generated voting transaction data to the authentication server 200*c*. Although a case in which the voting coins are transmitted to the authentication server 200*c* will be described as an example, the voting coins may be transmitted to the authentication server 200*a* or 200*b*, instead. At this stage, information indicating a holder of the voting coins transmitted to the authentication server 200*c* indicates the authentication server 200*c* (refer to FIG. 9B).

In step S104, the authentication server 200*c* performs a process for synchronizing with the authentication servers 200*a* and 200*b*. In this synchronization process, the authentication server 200*c* transmits the received voting transaction data to the authentication servers 200*a* and 200*b* using the synchronization unit 215. The synchronization units 215 of the authentication servers 200*a* and 200*b* store the voting transaction data received from the synchronization unit 215 of the authentication server 200*c*.

Voting Process

Figure 10:
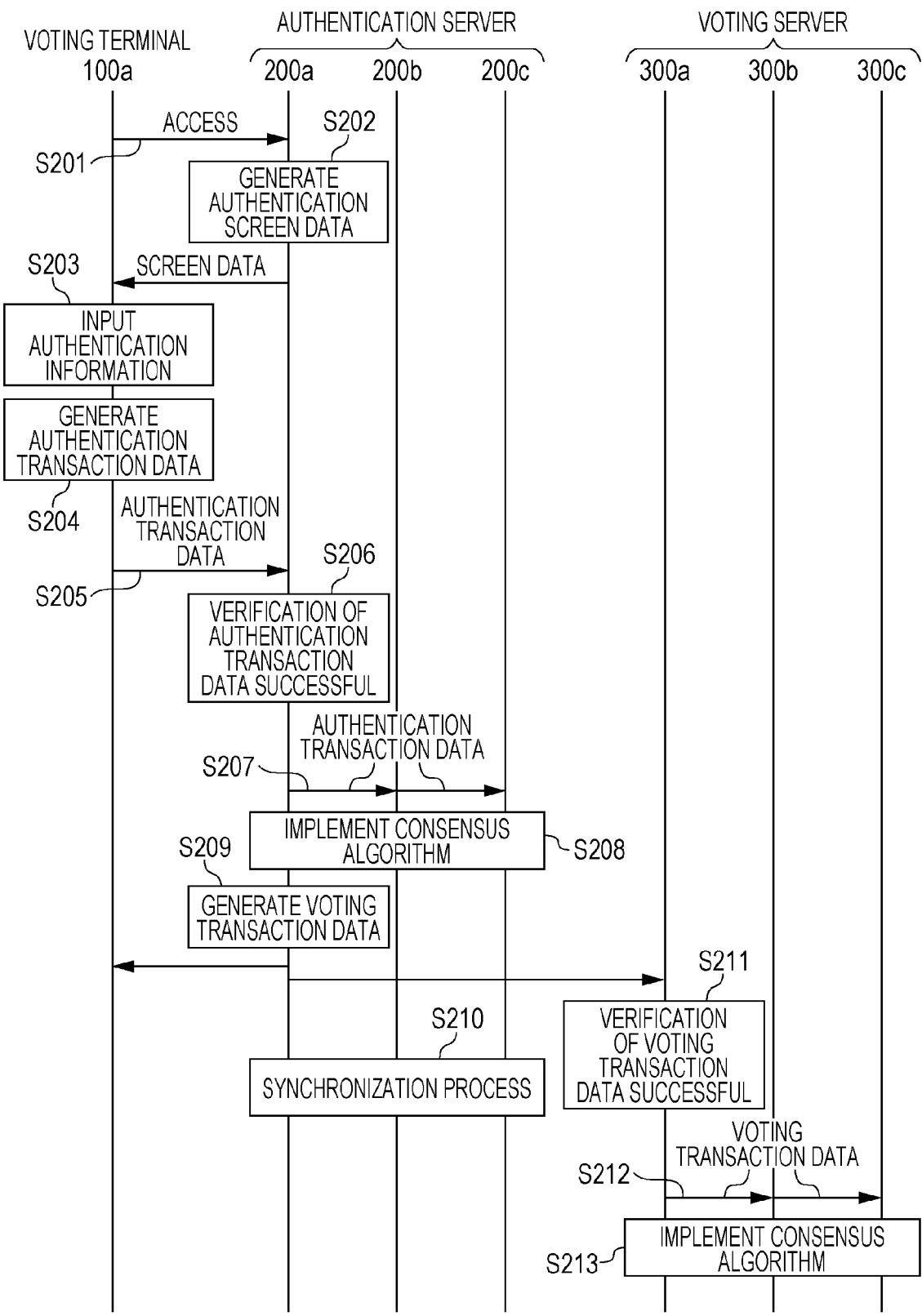
FIG. 10 is a first sequence diagram illustrating a voting process performed by the electronic voting system according to the embodiment.
Figure 11:
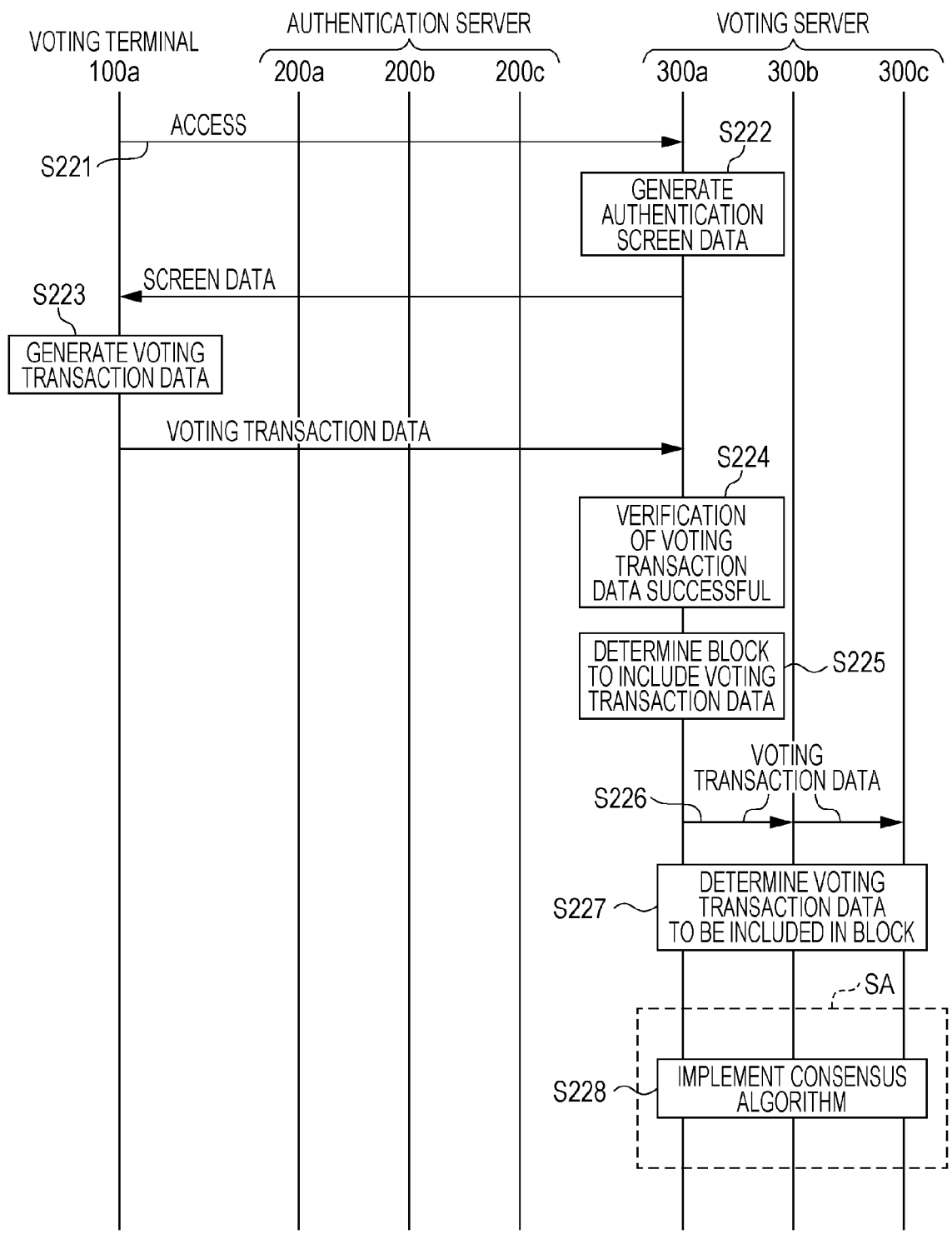
FIG. 11 is a second sequence diagram illustrating the voting process performed by the electronic voting system according to the embodiment.

FIGS. 10 and 11 are sequence diagrams illustrating the voting process performed by the electronic voting system 10 according to the present embodiment. FIGS. 12, 13A, and 13B are diagrams illustrating holders of the authentication coins and the voting coins during the voting process according to the present embodiment.

The voting process illustrated in FIGS. 10 and 11 is performed once when a voter casts a vote and performed as many times as the number of voters in an election.

In step S201, the voting terminal 100*a* accesses the authentication server 200*a*. The voting terminal 100*a* accesses a website provided by the authentication server 200*a*, for example, and employs hypertext transfer protocol (HTTP), HTTP over secure sockets layer (SSL)/transport layer security (TLS) (HTTPS), or the like.

In step S202, the authentication server 200*a* generates screen data regarding an authentication screen for obtaining an elector ID of a voter in accordance with the access in step S201 and transmits the screen data to the voting terminal 100*a*.

In step S203, the voting terminal 100*a* displays the authentication screen on the basis of the screen data transmitted in step S202 and receives authentication information regarding an elector ID of a voter. The voter views the authentication screen displayed on the voting terminal 100a and inputs, to the voting terminal 100a, the elector ID distributed in advance. The voter may manually input the elector ID or input the elector ID by reading a barcode or a two-dimensional code indicating the elector ID using the voting terminal 100a.

In step S204, the voting terminal 100a generates authentication transaction data using the elector ID input in step S203 as an authentication ID.

In step S205, the voting terminal 100a transmits the authentication transaction data generated in step S204 to the authentication server 200a. Although a case in which the authentication transaction data is transmitted to the authentication server 200a will be described as an example, the authentication transaction data may be transmitted to the authentication server 200b or 200c, instead. The authentication server 200a receives the transmitted authentication transaction data.

In step S206, the authentication server 200a verifies the authentication transaction data received from the voting terminal 100a in step S205. In the verification of the authentication transaction data, a blockchain of the authentication transaction data stored in the storage unit 216 is referred to, and whether the elector ID included in the authentication transaction data received from the voting terminal 100a is stored in the blockchain. If it is determined that the elector ID is not stored in the blockchain, the verification of the authentication transaction data is successfully completed. If it is determined that the elector ID is already stored, the verification of the authentication transaction data fails.

If the verification of the authentication transaction data fails in step S206, the authentication server 200a performs an error process (not illustrated). In the error process, for example, an error message is transmitted to the voting terminal 100a. The error message may include a message such as "Not an elector" or "Already authenticated. Same elector ID unavailable". In the error process, a future voting action, such as transmission of voting data performed by the voting terminal 100a, is prohibited.

If the verification of the authentication transaction data is successfully completed in step S206, the process proceeds to step S207.

In step S207, the authentication server 200a transmits copies of the authentication transaction data to the authentication servers 200b and 200c. The authentication servers 200b and 200c verify the received authentication transaction data.

In step S208, the authentication servers 200a to 200c implement the consensus algorithm. By implementing the consensus algorithm, it is verified that the received authentication transaction data indicates a legitimate transaction. The authentication servers 200a to 200c generate a block including the verified authentication transaction data. As a result, a block including the authenticated elector ID is generated, and even if authentication transaction data including the same elector ID is received thereafter, it can be determined that the same elector ID has been used twice by referring to the blockchain. At this stage, the holder of an authentication coin including the authenticated elector ID of the elector has been changed to the authentication server 200a (refer to FIG. 12).

In step S209, the authentication server 200a generates voting transaction data for transmitting a voting coin to the voting terminal 100a that has transmitted the authentication transaction data in step S205 and transmits the generated voting transaction data to the voting terminal 100a and the voting server 300a. At this time, a voting ID of the voting transaction data may be randomly selected. By randomly selecting the voting ID, voting IDs are not selected in chronological order, that is, voting IDs are selected regardless of chronological order, and it becomes even more difficult to identify votes cast by voters. Voting IDs that have already been selected may be stored and an ID other than the stored IDs may be selected, or a blockchain ledger may be referred to and a voting ID owned by the authentication server 200a or the like may be selected.

In step S210, the authentication server 200a transmits copies of the generated voting transaction data to the authentication servers 200b and 200c to synchronize the voting transaction data. The authentication servers 200a to 200c store the voting coin relating to the generated voting transaction data as a used coin.

In step S211, the voting server 300a verifies the voting transaction data received from the authentication server 200a in step S209. In the verification of the voting transaction data, a blockchain of the voting transaction data stored in the storage unit 318 is referred to, and whether a voting ID included in the voting transaction data received from the authentication server 200a is stored in the blockchain is determined. If it is determined that the voting ID is not stored in the blockchain, the verification of the voting transaction data is successfully completed. If it is determined that the voting ID is already stored in the blockchain, the verification of the voting transaction data fails.

If the verification of the voting transaction data fails in step S211, the voting server 300a performs an error process (not illustrated). In the error process, for example, an error message is transmitted to the voting terminal 100a. The error message may include a message such as "Already voted. Same ID unavailable". In the error process, a future voting action, such as transmission of voting data performed by the voting terminal 100a, is prohibited.

In step S212, the voting server 300a transmits copies of the voting transaction data to the voting servers 300b and 300c. The voting servers 300b and 300c verify the received voting transaction data.

In step S213, the voting servers 300a to 300c implement the consensus algorithm. By implementing the consensus algorithm, it is verified that the received voting transaction data indicates a legitimate transaction. The voting servers 300a to 300c generate a block including the verified voting transaction data. At this stage, the holder of a voting coin transmitted to the voter for whom the verification of the authentication transaction data has been successfully completed in step S206 has been changed to the voting terminal 100a (refer to FIG. 13A).

In step S221, the voting terminal 100a accesses the voting server 300a. The voting terminal 100a accesses a website provided by the voting server 300a, for example, and employs HTTP, HTTPS, or the like. At this time, the voting server 300a refers to the candidate database 312 and generates screen data including a list of candidates. A voting screen is a screen used by the voter to select a candidate to vote for.

In step S222, the voting server 300a generates screen data regarding a voting screen for voting performed by the voter in accordance with the access in step S221 and transmits the screen data to the voting terminal 100a. At this time, the voting server 300a refers to the candidate database 312 and generates screen data including a list of candidates. The voting screen is a screen used to select a candidate to vote for.

In step S223, the voting terminal 100a displays the voting screen on the basis of the screen data transmitted in step S222 and receives information indicating a candidate to vote for. The voter views the voting screen displayed on the voting terminal 100a and inputs voting information, which indicates a candidate to vote for. The voter may input the voting information by operating the screen displayed on the display device or by manually inputting information such as a name of the candidate to vote for. Upon receiving, from the voter, the voting information indicating the candidate to vote for, the voting terminal 100a generates voting transaction data including the voting information. The voting transaction data is used to transmit the voting coin to the candidate to vote for. The voting terminal 100a transmits the generated voting transaction data to the voting server 300a.

In step S224, the voting server 300a verifies the voting transaction data received from the voting terminal 100a in step S223. In the verification of the voting transaction data, the blockchain of the voting transaction data stored in the storage unit 318 is referred to, and whether the voting ID included in the voting transaction data received from the voting terminal 100a is stored in the blockchain is determined. If it is determined that the voting ID is not stored in the blockchain, the verification of the voting transaction data is successfully completed. If it is determined that the voting ID is already stored in the blockchain, the verification of the voting transaction data fails.

If the verification of the voting transaction data fails in step S224, the voting server 300a performs an error process (not illustrated). In the error process, for example, an error message is transmitted to the voting terminal 100a. The error message may include a message such as "Already voted. Same voting ID unavailable".

If the verification of the voting transaction data is successfully completed in step 224, the process proceeds to step S225.

In step S225, the voting server 300a determines a block to include voting transaction data. More specifically, the determination unit 315 of the voting server 300a determines a block ID of a block to include the voting transaction data transmitted in step S223. The block ID is a block ID of a block to be generated in step S228, which is included in the same process that includes the present step or performed after the process that includes the present step. Here, the block ID may be randomly determined, or may be determined on the basis of information received from the voting terminal 100a.

In step S226, the voting server 300a transmits copies of the voting transaction data to the voting servers 300b and 300c. The voting servers 300b and 300c verify the received voting transaction data and store the voting transaction data in the storage unit 318. In addition, the voting server 300a shares the block ID determined in step S225 with the determination units 315 of the other voting servers 300b and 300c by transmitting the block ID to the voting servers 300b and 300c.

In step S227, the voting server 300a determines voting transaction data to be included in the block to be generated in step S228. The voting transaction data to be included is determined on the basis of the determination made in step S225. In addition, the voting servers 300b and 300c determine that the block having the block ID received in step S226 is to include the voting transaction data transmitted in step S223.

In step S228, the voting servers 300a to 300c implement the consensus algorithm. By implementing the consensus algorithm, it is verified that the received voting transaction data indicates a legitimate transaction. If it is verified that the received voting transaction data indicates a legitimate transaction, a block including the verified voting transaction data is generated. As a result, a block including the voting ID that has been used for voting is generated, and even if voting transaction data including the same voting ID is received thereafter, it can be determined that the same voting ID has been used twice by referring to the blockchain. At this stage, the holder of the voting coin used by the voter for voting has been changed to a candidate X, for whom the voter has voted (refer to FIG. 13B).

The consensus algorithm is not always performed in step S226 in each voting process but performed only when there is voting transaction data to be included in a block to be generated. This will be described hereinafter.

Figure 15:
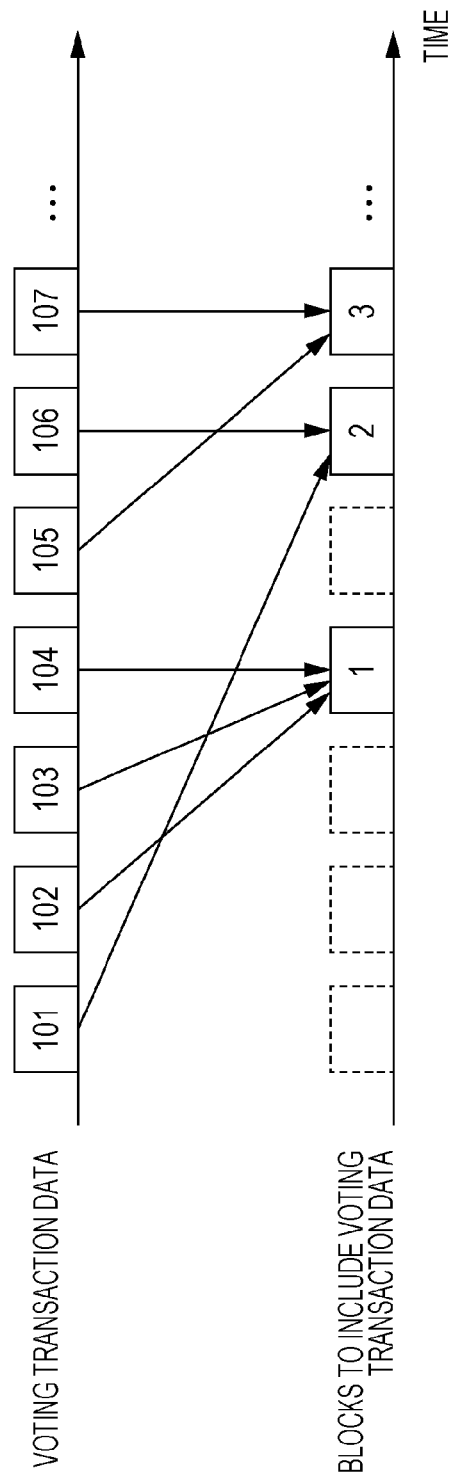
FIG. 15 is a diagram illustrating inclusion of voting transaction data in the blocks according to the embodiment.

FIG. 14 is a diagram illustrating block IDs of blocks to include voting transaction data according to the present embodiment. FIG. 15 is a diagram illustrating inclusion of voting transaction data in the blocks according to the embodiment.

FIG. 14 illustrates block IDs for storing voting transaction data determined by the determination unit 315.

More specifically, FIG. 14 illustrates candidates who have obtained voting coins whose voting IDs are 101 to 107, respectively, and block IDs of blocks to store the voting coins.

The voting coin whose voting ID is 101, for example, has been given to the candidate X, and the determination unit 315 has determined that the voting coin is to be included in a block whose block ID is 2. In addition, the voting coin whose voting ID is 102 has been given to a candidate Y, and the determination unit 315 determines that the voting coin is to be included in a block whose block ID is 1. The same holds for other voting coins.

In this case, the voting transaction data are included in blocks as illustrated in FIG. 15. In FIG. 15, a horizontal axis represents time. Voting transaction data received by the voting server 300a is indicated in an upper part, and blocks to store the voting transaction data are indicated in a lower part.

As illustrated in FIG. 15, pieces of voting transaction data whose voting IDs are 102, 103, and 104, respectively, are stored in the block whose block ID is 1. In addition, pieces of voting transaction data whose voting IDs are 101 and 106, respectively, are stored in the block whose block ID is 2. The same holds for other voting coins.

If there is no voting transaction data to be included in a block as indicated in FIG. 15 by rectangles in broken lines, a block is not generated, and the consensus algorithm is not implemented.

Figure 16:
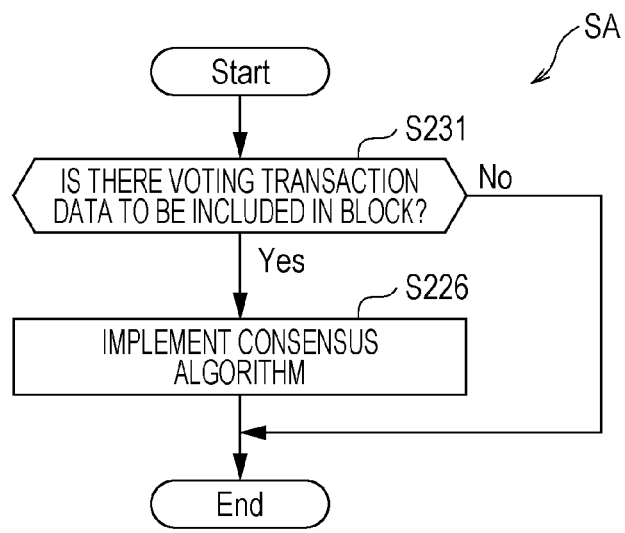
FIG. 16 is a process for determining whether to implement a consensus algorithm according to the embodiment.

FIG. 16 is a flowchart illustrating a process for determining whether to implement the consensus algorithm according to the present embodiment. The process illustrated in FIG. 16 is a process included in step SA illustrated in FIG. 11. It is sufficient that at least one of the voting servers 300a to 300c performs the process illustrated in FIG. 16.

As illustrated in FIG. 16, in step S231, the determination unit 315 determines whether voting transaction data to be included in a blockchain in step S231, which is performed after the present step, is stored in the storage unit 318.

If the determination unit 315 determines in step S231 that the voting transaction data is stored in the storage unit 318 (YES in step S231), the voting servers 300a to 300c implement the consensus algorithm in step S226.

If the determination unit 315 determines that the voting transaction data is not stored in the storage unit 318 (NO in step S231), on the other hand, the voting process ends without the consensus algorithm being implemented. In this case, if the determination unit 315 determines that voting transaction data is not stored in the storage unit 318 in a voting process performed for a voter different from the voter in the present voting process (YES in step S231), the block generation unit 316 implements the consensus algorithm and generates a block.

As a result, voting transaction data is stored in blocks in order independent of order in which voters have voted. Even if the blocks are disclosed, therefore, correspondences between voters and candidates for which the voters have voted are not identified, that is, the votes are kept secret.

Ending Process

Figure 17:
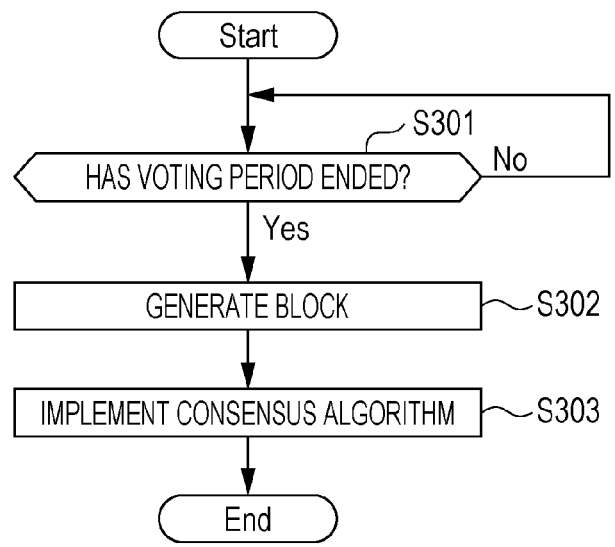
FIG. 17 is a flowchart illustrating a process for ending voting performed by the electronic voting system according to the embodiment.

FIG. 17 is a flowchart illustrating a process for ending voting performed by the electronic voting system 10 according to the present embodiment. It is sufficient that at least one of the voting servers 300a to 300c performs the process illustrated in FIG. 17.

As illustrated in FIG. 17, in step S301, the block generation unit 316 determines whether a voting period has ended. If the block generation unit 316 determines that the voting period has ended (YES in step S301), the process proceeds to step S302. If the block generation unit 316 determines that the voting period has not ended (NO in step S301), step S301 is performed again. That is, the block generation unit 316 waits in step S301 until the voting period ends.

In step S302, the storage unit 318 generates a block including voting transaction data stored in the storage unit 318 but not yet included in a blockchain and connects the generated block to the blockchain. At this time, the block may be generated and connected to the blockchain even if the voting transaction data stored in the storage unit 318 but not yet included in the blockchain does not satisfy the criterion of anonymization.

In step S303, the voting servers 300a to 300c implement the consensus algorithm. Step S303 is the same as step S226.

As a result, the voting servers 300a to 300c can connect all voting transaction data to a blockchain.

Process for Disclosing Voting Results

Figure 18:
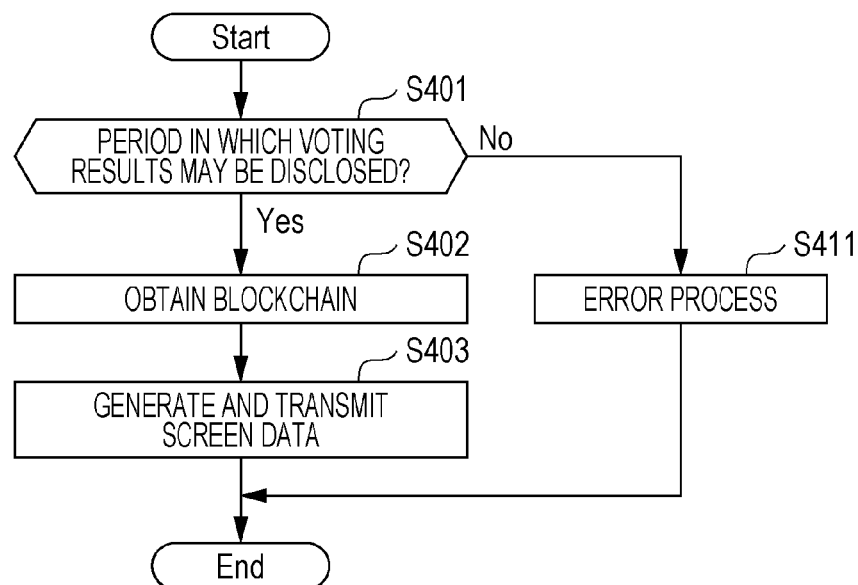
FIG. 18 is a sequence diagram illustrating a process for disclosing voting results performed by the voting server according to the embodiment.

FIG. 18 is a sequence diagram illustrating a process for disclosing voting results performed by the voting server 300a according to the embodiment.

The process illustrated in FIG. 18 is performed when a terminal 110 has accessed the voting server 300a in order to disclose voting results. The terminal 110 accesses a website provided by the voting server 300a, for example, and employs HTTP, HTTPS, or the like. The terminal 110 that accesses the voting server 300a may be the voting terminal 100a or another terminal.

Although a case in which the voting server 300a is accessed will be described as an example, the same holds when the voting server 300b or 300c is accessed.

In step S401, the screen data generation unit 311 of the voting server 300a determines whether it is a period in which voting results may be disclosed. The period in which voting results may be disclosed will also be referred to as a "disclosure period". A disclosure period comes after an end of a voting period, for example, that is, after voting ends. If the screen data generation unit 311 determines in step S401 that it is a disclosure period (YES in step S401), the process proceeds to step S402. If not (NO in step S401), the process proceeds to step S411.

In step S402, the screen data generation unit 311 obtains a blockchain storing voting transaction data stored in the storage unit 318.

In step S403, the screen data generation unit 311 generates screen data regarding a voting result screen on the basis of information included in the blockchain obtained in step S402. The screen data generation unit 311 then transmits the generated screen data to the terminal 110 to display the voting result screen on the terminal 110.

In step S411, the screen data generation unit 311 performs an error process. In the error process, for example, an error message is transmitted to the terminal 110. The error message may include a message such as "Not a disclosure period. Voting results unavailable".

Now, an example of a screen displayed on the voting terminal 100a for voting in the electronic voting system 10 and a screen displayed on the voting terminal 100a for disclosure of voting results will be described.

Figure 19:
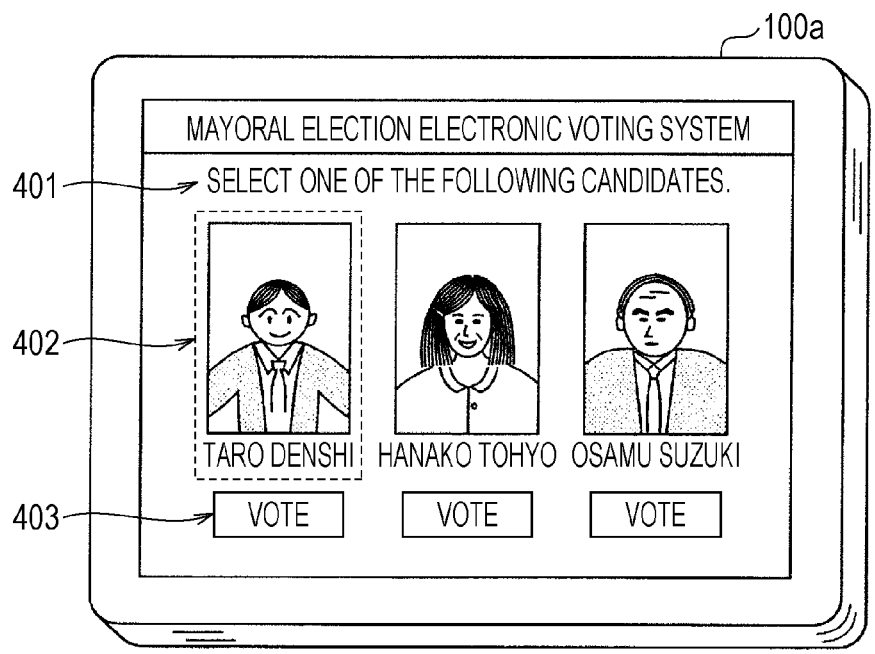
FIG. 19 is a schematic diagram illustrating the voting terminal used for voting in the electronic voting system according to the embodiment.

FIG. 19 is a schematic diagram illustrating the voting terminal 100a used for voting in the electronic voting system 10 according to the present embodiment.

The voting terminal 100a illustrated in FIG. 19 displays, to a voter, a screen for selecting a candidate to vote for.

The screen illustrated in FIG. 19 includes an image 401 indicating a message for prompting the voter to vote. The screen also includes images 402 of candidates' names and faces and images 403 of buttons for voting for the candidates. If the voter presses one of the images 403, that is, the voting buttons, the input unit 112 receives a vote for a candidate corresponding to the pressed voting button.

Figure 20:
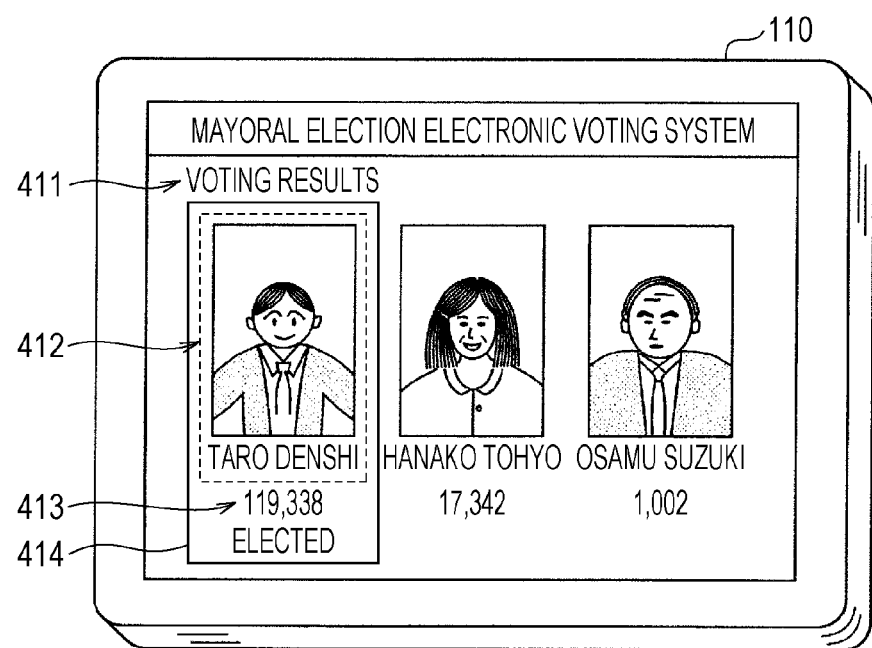
FIG. 20 is a schematic diagram illustrating a terminal used to disclose voting results in the electronic voting system according to the embodiment.

FIG. 20 is a schematic diagram illustrating the terminal 110 used to disclose voting results in the electronic voting system 10 according to the present embodiment.

The terminal 110 illustrated in FIG. 20 displays a screen for disclosing voting results to the voter.

The screen illustrated in FIG. 20 includes an image 411 indicating a message notifying the voter that voting results are displayed. The screen also includes images 412 of the candidates' names and faces and images 413 indicating the number of votes obtained by the candidates. The image 412 of a candidate who has obtained the largest number of votes is framed by an image 414, which indicates election.

The terminal 110 presents voting results with this kind of screen.

1.6 Advantageous Effects Produced by Embodiment

An electronic voting system according to the present embodiment employs data including IDs different between authentication of legitimate voters and voting performed after the authentication. As a result, even if results of authentication and votes are disclosed after an election, for example, voters who have cast the votes are not identified. In addition, since data indicating the authentication and data indicating the votes are stored in different blockchains, the data is not altered. Furthermore, since blocks storing votes are generated and connected in unique order in a blockchain storing the votes, the votes cast by the voters are not identified. The electronic voting system therefore achieves a secret ballot.

In addition, the electronic voting system includes voting transaction data and stores the voting transaction data in a blockchain in random order. As a result, since the order of the voting transaction data is random, the electronic voting system suppresses identification of votes, that is, correspondences between voters and votes, even if the blockchain storing the votes is disclosed. In addition, the electronic voting system 10 stores data including votes cast by voters in a blockchain. The electronic voting system 10 therefore achieves a secret ballot while suppressing alteration to the votes cast by the voters. The electronic voting system therefore achieves a secret ballot.

In addition, the electronic voting system includes voting transaction data in blocks determined on the basis of information received from a terminal and stores the voting transaction data in a blockchain. As a result, since the electronic voting system determines blocks to include voting transaction data on the basis of information set independently of voting servers, independence between order in which voters vote and order of blocks storing votes further increases.

In addition, the electronic voting system can determine the same blocks to include voting transaction data between voting servers.

In addition, as in the above case, the electronic voting system achieves a secret ballot using a terminal that is not included therein.

2. Modifications

Although the present disclosure has been described on the basis of the embodiment, it is needless to say that the present disclosure is not limited to the embodiment. The present disclosure includes the following cases.

(1) Although the authentication servers and the voting servers are described as different apparatuses in the above embodiment, the authentication servers and the voting servers may be the same apparatuses, instead. At this time, storage units included in the authentication servers are not disclosed to the voting terminals and the like.

(2) Although authentication and voting are achieved by transmitting authentication coins and voting coins in the above embodiment, the coins are used as an example of a virtual transaction tool, and the virtual transaction tool is not limited to coins.

(3) Although the voting servers determine block IDs of blocks to include voting transaction data in the above embodiment, the voting servers may determine timings at which voting transaction data is to be included in blocks, instead.

(4) Although the authentication servers transmit voting coins to the voting terminals in the above embodiment, voting transactions in which voting coins are transmitted to the voting terminals may be transmitted to the voting servers, instead. Alternatively, the voting servers may receive voting transactions from the authentication servers and verify the voting transactions. In this case, the transmission of the voting coins to the voting terminals can also be managed using a blockchain.

(5) Although the disclosure of voting results is performed on the basis of access from a voting terminal in the above embodiment, any terminal capable of accessing a voting server may be used. Alternatively, a voting server may disclose a blockchain including a voting transaction.

(6) Although electronic voting for an election has been described as an example in the above embodiment, the electronic voting system may be used for voting in general, a confidence vote, or a questionnaire, instead. When the electronic voting system is used for a decision-making process in a general meeting of stockholders or a questionnaire, for example, alteration to a decision or results of the questionnaire can be prevented.

(7) Although a voting server determines, among a plurality of blocks, a block to include voting transaction data after receiving a voting transaction from a voting terminal in the above embodiment, a voting server may determine a block to include voting transaction data in accordance with a certain algorithm, instead. At this time, the algorithm need not be disclosed, and only the voting server may manage the algorithm. The algorithm may be prepared such that a received voting transaction whose vote is the same as that of another voting transaction is included in a next block, that is, it is sufficient that votes are not identified.

(8) Each apparatus in the above embodiment is specifically a computer system including a microprocessor, a read-only memory (ROM), a random-access memory (RAM), a hard disk unit, a display unit, a keyboard, and a mouse. The RAM or the hard disk unit stores a computer program. Each apparatus achieves the functions thereof when the microprocessor operates in accordance with the computer program. The computer program is obtained by combining a plurality of instruction codes indicating commands for a computer in order to achieve the certain functions.

(9) Some or all of the components of each apparatus in the above embodiment may be achieved by a single system large-scale integration (LSI) circuit. The system LSI circuit is a super-multifunctional LSI circuit fabricated by integrating a plurality of components on a single chip and is specifically a computer system including a microprocessor, a ROM, and a RAM. The RAM stores a computer program. The system LSI circuit achieves functions thereof when the microprocessor operates in accordance with the computer program.

Alternatively, each of the components of each apparatus may be achieved by a single chip, or some or all of the components of each apparatus may be achieved by a single chip.

Although the term "system LSI circuit" has been used, a term "IC", "LSI circuit", "super LSI circuit", or "ultra LSI circuit" might be used depending on a degree of integration. In addition, some or all of the components of each apparatus in the above embodiment need not necessarily be achieved by an LSI circuit and may be achieved by a dedicated circuit or a general-purpose processor, instead. A field-programmable gate array (FPGA) that can be programmed after an LSI circuit is fabricated or a reconfigurable processor capable of reconfiguring connections and settings of circuit cells inside an LSI circuit may be used, instead.

If a technique for fabricating an integrated circuit that replaces LSI becomes available as a result of evolution of semiconductor technologies or derivative techniques, the functional blocks may be integrated using the technique. Application of biotechnology is one of such possibilities.

(10) Some or all of the components of each apparatus may be achieved by an IC card or a separate module removably attached to each apparatus. The IC card or the module is a computer system including a microprocessor, a ROM, and a RAM. The IC card or the module may include the super-multifunctional LSI circuit. The IC card or the module achieves functions thereof when the microprocessor operates in accordance with a computer program. The IC card or the module may be tamper-resistant.

(11) The present disclosure may be one of the above-described methods. The present disclosure may be a computer program that achieves one of the methods or may be a digital signal including the computer program.

In addition, the present disclosure may be a computer-readable recording medium storing the computer program or the digital signal, such as a flexible disk, a hard disk, a CD-ROM, a magneto-optical (MO) disk, a digital versatile disc (DVD), a DVD-ROM, a DVD-RAM, a Blu-ray disc (BD; registered trademark), or a semiconductor memory. In addition, the present disclosure may be the digital signal stored in the recording medium.

In addition, the present disclosure may be the computer program or the digital signal transmitted through an electrical communication line, a wireless or wired communication line, a network typified by the Internet, datacasting, or the like.

In addition, the present disclosure may be a computer system including a microprocessor and a memory. The memory may store the computer program, and the microprocessor may operate in accordance with the compute program.

In addition, the present disclosure may be implemented by another independent computer system by storing the program or the digital signal in the recording medium and transporting the recording medium or by transporting the program or the digital signal through the network or the like.

(12) The above embodiment and the modifications may be combined with one another.

The electronic voting system 10 according to the present embodiment may be described as follows but not limited to these.

(a) An electronic voting system includes a voting terminal, a plurality of authentication servers, and a plurality of voting servers. The voting terminal includes a first transaction generator that generates an authentication transaction and a voting transaction. The first transaction generator generates the authentication transaction from an ID of an elector, transmits the authentication transaction to one of the plurality of authentication servers, generates a second voting transaction from a first voting transaction in which a right of voting is granted from the authentication server, and transmits the second voting transaction to one of the plurality of voting servers. Each of the plurality of authentication servers includes a first transaction verifier that receives the authentication transaction from the voting terminal and that verifies the authentication transaction, a second transaction generator that generates the authentication transaction, and a first block generator that generates a block of the authentication transaction. The transaction verifier receives the authentication transaction, verifies whether two or more of an ID included in the authentication transaction exist in a blockchain, and if so, determines that the ID has been used twice. If the transaction verifier has successfully completed the authentication transaction, the second transaction generator generates the first voting transaction from a third voting transaction received from the voting server and transmits the first voting transaction to the voting terminal. Each of the plurality of voting servers includes a second transaction verifier that receives the second voting transaction from the voting terminal and that verifies the second voting transaction, a third transaction generator that generates the voting transaction, a determiner that determines a timing at which the voting transaction is to be included in a block, and a second block generator that generates the block of the voting transaction. The second transaction verifier receives the second voting transaction from the voting terminal, verifies whether two or more of a right of voting included in the second voting transaction exist in a blockchain, and if so, determines that the right of voting has been used twice. The third transaction generator generates a third voting transaction of the right of voting and transmits the third voting transaction to the authentication server. The second block generator generates the block of the voting transaction extracted from the second voting transaction in accordance with a timing determined by the determiner at which the voting transaction is to be included.

(b) In the electronic voting system according to (a), the determiner of each of the plurality of voting servers also shares the timing at which the voting transaction is to be included with the other voting servers.

(c) In the electronic voting system according to (a), the determiner of each of the plurality of voting servers also determines the timing at which the voting transaction is to be included on the basis of information received from the voting terminal.

As a result, whether a voter is an elector is determined between the voting terminal and the authentication server. If so, the authentication server grants the right of voting to the voting terminal, the right of voting having been originally granted from the voting server. The voting terminal can vote using the granted right of voting. Since the voting server verifies whether the right of voting has been used twice, illegitimate voting can be prevented without information regarding the elector. In addition, the voting server prevents alteration to a voting result using a blockchain for a voting transaction. Furthermore, by randomly determining a timing at which a voting transaction is to be included in a block, a vote cast by a user is not identified. As a result, a safe electronic voting system can be constructed.

Although the electronic voting system and the like according to one or a plurality of aspects have been described above on the basis of the embodiment, the present disclosure is not limited to the embodiment. The one or plurality of aspects may include modes obtained by modifying the embodiment in various ways conceivable by those skilled in the art without deviating from the scope of the present disclosure and modes constructed by combining components in different embodiments.

The electronic voting system in the present disclosure achieves a secret ballot.

What is claimed is:

1. A method for controlling one of a plurality of voting servers in an electronic voting system, the method comprising:
    receiving, from one or more terminals used by a plurality of voters to vote, a plurality of transaction data including voting data in a first sequential order, the voting data including a voting identifier associated with a vote and voting information indicating the vote cast by a respective voter;
    determining, by a processor, a plurality of blocks to include the plurality of transaction data;
    generating, using the processor, the plurality of blocks, wherein the plurality of blocks that are generated are void of voter identification information;
    storing, in at least one block of the plurality of blocks, transaction data of two or more voters among the plurality of voters;
    connecting the plurality of blocks that store the plurality of transaction data to a blockchain, such that the plurality of transaction data is stored in the blockchain in a second sequential order that is different and independent of the first sequential order; and
    storing the blockchain including the connected plurality of blocks in a memory,
    wherein the second sequential order is established subsequent to establishing of the first sequential order, and the second sequential order assigns voting information of adjacent voting identifiers to non-adjacent blocks of the plurality of blocks.

2. The method according to claim 1,
    wherein in the determining, a block ID of each of the plurality of blocks to include the transaction data is determined.

3. The method according to claim 2,
    wherein the block ID is determined randomly.

4. The method according to claim 2,
    wherein the block ID is determined on based on information received from one or more terminals.

5. The method according to claim 2,
wherein the method further comprises,
transmitting the determined block ID to the plurality of voting servers.

6. The method according to claim 1,
wherein the method further comprises,
implementing a consensus algorithm when the plurality of blocks is determined, and
generating the plurality of blocks after implementing the consensus algorithm.

7. The method according to claim 1, wherein
the plurality of transaction data is received in the first sequential order,
the plurality of transaction data is included in the blockchain in the second sequential order, and
the first sequential order is independent of the second sequential order.

8. The method according to claim 1, wherein
the plurality of transaction data includes a first transaction data and a second transaction data,
the plurality of blocks includes a first block and a second block,
in the receiving, the second transaction data is received after receiving the first transaction data,
in the generating, (i) the first block including the second transaction data and (ii) the second block including the first transaction data are generated, and
in the connecting, the second block is connected to the blockchain after the first block.

9. The method according to claim 1, wherein the first sequential order sequences a first voting identifier to be arranged before a second voting identifier, and sequences the second voting identifier to be arranged before a third voting identifier, and
wherein the second sequential order sequences a block containing voting information of the third voting identifier to be arranged before a block containing voting information of the second voting identifier or the first voting identifier.

10. A computer comprising:
a processor; and
a memory that stores a program for causing the processor to execute the method according to claim 1.

11. A non-transitory storage medium storing a program that causes a processor to execute the method according to claim 1.

* * * * *